(12) United States Patent
Levensalor et al.

(10) Patent No.: US 12,382,311 B1
(45) Date of Patent: Aug. 5, 2025

(54) SYSTEMS AND METHODS FOR REDUCING COMMUNICATION NETWORK PERFORMANCE DEGRADATION USING IN-BAND TELEMETRY DATA

(71) Applicant: Cable Television Laboratories, Inc., Louisville, CO (US)

(72) Inventors: Randy Levensalor, Boulder, CO (US); Joseph Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/935,050

(22) Filed: Sep. 23, 2022

Related U.S. Application Data

(60) Division of application No. 16/936,300, filed on Jul. 22, 2020, now Pat. No. 11,968,548, which is a continuation-in-part of application No. 16/507,893, filed on Jul. 10, 2019, now Pat. No. 12,206,549.

(60) Provisional application No. 62/877,000, filed on Jul. 22, 2019, provisional application No. 62/853,491, filed on May 28, 2019, provisional application No. 62/795,852, filed on Jan. 23, 2019, provisional application No. 62/788,283, filed on Jan. 4, 2019, provisional application No. 62/695,912, filed on Jul. 10, 2018.

(51) Int. Cl.
| | | |
|---|---|---|
| G06F 11/00 | (2006.01) | |
| H04L 12/28 | (2006.01) | |
| H04L 12/54 | (2022.01) | |
| H04L 41/0823 | (2022.01) | |
| H04L 43/08 | (2022.01) | |
| H04W 24/02 | (2009.01) | |

(52) U.S. Cl.
CPC ......... *H04W 24/02* (2013.01); *H04L 41/0823* (2013.01); *H04L 43/08* (2013.01)

(58) Field of Classification Search
CPC ............... H04L 1/1614; H04L 12/56; H04L 2012/5625; H04L 41/08; H04L 41/26; H04L 45/00; H04L 47/10; H04L 47/20
See application file for complete search history.

(56) References Cited

U.S. PATENT DOCUMENTS

| | | | |
|---|---|---|---|
| 8,072,976 B2 | 12/2011 | Bennett | |
| 10,547,560 B1 * | 1/2020 | Patel | ................... H04L 43/0852 |
| 2003/0202520 A1 | 10/2003 | Witkowski et al. | |
| 2004/0148391 A1 | 7/2004 | Lake et al. | |

(Continued)

OTHER PUBLICATIONS

Broadcom, In-band-Telemetry, Jun. 2017, https://docs.broadcom.com/doc/IBT-PB100, pp. 1-4 (Year: 2017).*
U.S. Appl. No. 17/060,921, filed Oct. 1, 2020, Dan Schrimpsher.

*Primary Examiner* — Nicholas R Taylor
*Assistant Examiner* — Ho T Shiu
(74) *Attorney, Agent, or Firm* — PdZ Patent Law, PLLC

(57) ABSTRACT

A method for reducing communication network performance degradation using in-band telemetry data includes (a) adding in-band telemetry data to one or more data structures flowing through a network element of a communication network, (b) updating a telemetry table according to first telemetry data that is based on the in-band telemetry data, (c) selecting one of a plurality of paths in the communication network at least partially based on data in the telemetry table, and (d) causing a data structure to be routed through the selected one of the plurality of paths in the communication network.

15 Claims, 17 Drawing Sheets

(56) References Cited

U.S. PATENT DOCUMENTS

| | | |
|---|---|---|
| 2005/0108444 A1 | 5/2005 | Flauaus et al. |
| 2007/0211647 A1 | 9/2007 | Hao et al. |
| 2008/0043716 A1* | 2/2008 | Toombs ................. H04L 45/00 |
| | | 370/351 |
| 2009/0109847 A1* | 4/2009 | Stephenson ......... H04L 47/2441 |
| | | 370/232 |
| 2009/0177404 A1 | 7/2009 | Hartmann et al. |
| 2010/0180048 A1 | 7/2010 | Guo et al. |
| 2011/0197274 A1 | 8/2011 | Callon et al. |
| 2011/0231551 A1 | 9/2011 | Hassan et al. |
| 2012/0157106 A1 | 6/2012 | Wang et al. |
| 2017/0052821 A1 | 2/2017 | Wu et al. |
| 2017/0272465 A1 | 9/2017 | Steele |
| 2018/0069786 A1 | 3/2018 | Lokman et al. |
| 2018/0123705 A1 | 5/2018 | Henry et al. |
| 2018/0131617 A1 | 5/2018 | Hira |
| 2018/0167450 A1 | 6/2018 | Cherukuri et al. |
| 2018/0191619 A1* | 7/2018 | Karthikeyan ........... H04L 47/76 |
| 2018/0288091 A1 | 10/2018 | Doron et al. |
| 2018/0331890 A1* | 11/2018 | Song ....................... H04L 41/08 |
| 2018/0359184 A1 | 12/2018 | Inbaraj et al. |
| 2018/0359811 A1 | 12/2018 | Verzun et al. |
| 2018/0367412 A1 | 12/2018 | Sethi et al. |
| 2019/0014394 A1* | 1/2019 | Anand .................... H04L 45/38 |
| 2019/0068693 A1 | 2/2019 | Bernat |
| 2019/0132206 A1 | 5/2019 | Hanes et al. |
| 2019/0140976 A1 | 5/2019 | Liou et al. |
| 2019/0190804 A1 | 6/2019 | Tang et al. |
| 2020/0021490 A1 | 1/2020 | Schrimpsher et al. |
| 2021/0126854 A1 | 4/2021 | Guo et al. |

\* cited by examiner

SYSTEMS AND METHODS FOR REDUCING COMMUNICATION NETWORK PERFORMANCE DEGRADATION USING IN-BAND TELEMETRY DATA

RELATED APPLICATIONS

This application is a divisional of U.S. patent application Ser. No. 16/936,300, filed on Jul. 22, 2020, which is a continuation-in-part of U.S. patent application Ser. No. 16/507,893, filed on Jul. 10, 2019, which claims benefit of priority to (a) U.S. Provisional Patent Application Ser. No. 62/695,912, filed on Jul. 10, 2018, (b) U.S. Provisional Patent Application Ser. No. 62/853,491, filed on May 28, 2019, (c) U.S. Provisional Patent Application Ser. No. 62/795,852, filed on Jan. 23, 2019, and (d) U.S. Provisional Patent Application Ser. No. 62/788,283, filed on Jan. 4, 2019. U.S. patent application Ser. No. 16/936,300 also claims benefit of priority to U.S. Provisional Patent Application Ser. No. 62/877,000, filed on Jul. 22, 2019. Each of the above-mentioned applications is incorporated herein by reference.

BACKGROUND

A shared communication link is a communication link that is shared by two or more communication network elements. One example of a shared communication link is a cable communication link where data is carried between a cable modem termination system (CMTS) and a plurality of cable modems (CMs) via shared communication media, such as coaxial electrical cable and/or fiber optic cable. Another example of a shared communication link is a fifth generation (5G) wireless communication link where data is carried between a wireless base station and a plurality of user equipment (UE) devices via shared radio frequency spectrum. Use of shared communication links advantageously enables high-performance communication services to be provided to multiple clients with minimal infrastructure and associated cost.

DETAILED DESCRIPTION OF THE EMBODIMENTS

Figure 1:
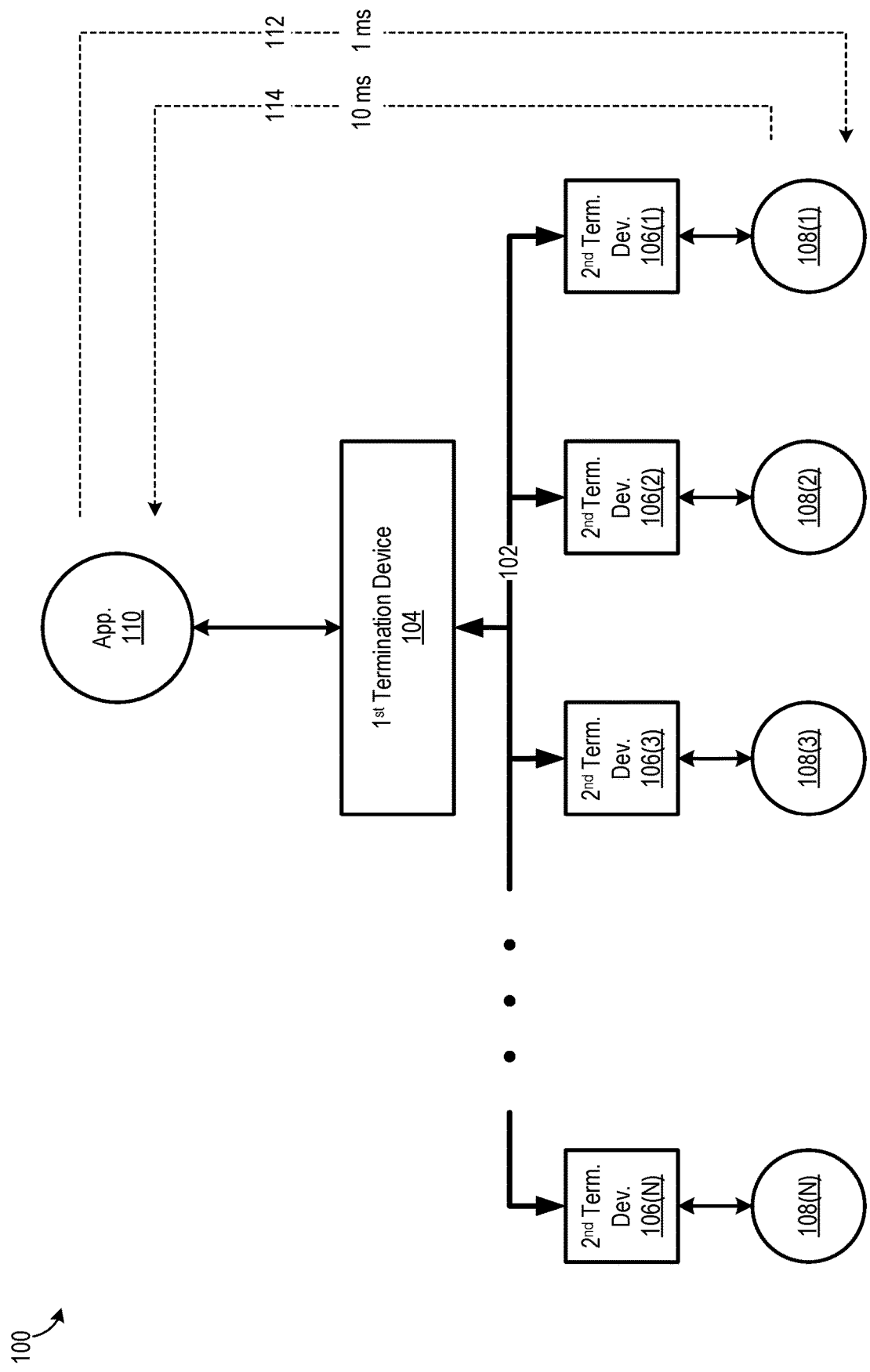
FIG. 1 is a schematic diagram of a communication network including a shared communication link.

While shared communication links have revolutionized modern society by enabling large-scale provisioning of high-performance and cost-effective communication services, shared communication links have some limitations. For example, FIG. 1 is a schematic diagram of a communication network 100 including a shared communication link 102, a first termination device 104, N second termination devices 106, a respective client 108 communicatively coupled to each second termination device 106, and an application 110 communicatively coupled to first termination device 104, where N is an integer greater than or equal to one. In this document, specific instances of an item may be referred to by use of a numeral in parentheses (e.g., client 108(1)) while numerals without parentheses refer to any such item (e.g., clients 108). First termination device 104 interfaces application 110 with shared communication link 102, and shared communication link 102 communicatively couples each second termination device 106 to first termination device 104. Each second termination device 106 interfaces its respective client 108 with shared communication link 102.

Shared communication link 102 transports data between first termination device 104 and each second termination device 106. Accordingly, shared communication link 102 is shared by clients 108. Consequently, a given client 108 may not be able to transmit as much data as desired due to the communication link being used by one or more other clients 108. Therefore, communication network 100 is configured to control flow of data between application 110 and clients 108 to help prevent excess queuing of data and/or delay in data transmission, due to capacity limitations of shared communication link 102.

For example, consider a scenario where client 108(1) is exchanging data with application 110, and where client 108(1) is sensitive to data transmission latency, such that client 108(1)'s operation will be impaired by delays in data transmission. Application 110 is accordingly configured to limit flow of data between application 110 and client 108(1) to a level which can be handled by shared communication link 102 under its current operating conditions, without excessive data queuing or excessive data transmission latency. For example, if client 108(1) fails to receive a data structure at an expected time, client 108(1) can infer that (1) there is excessive latency in downlink data 112 transmitted over shared communication link 102, and/or (2) there is excessive queuing of downlink data 112 structures at first termination device 104. In response, client 108(1) may send a message to application 110 requesting that application 110 reduce downlink data 112 transmission rate to a level which prevents excessive latency or queuing. In response, application 110 reduces downlink data 112 transmission rate, for example, by decreasing downlink throughput and/or by increasing compression of downlink data 112.

Delays in downlink data 112 transmission or uplink data 114 transmission may prevent application 110 from quickly reducing data transmission rate between application 110 and client 108(1), in response to an increase in congestion on shared communication link 102. For example, assume that the downlink data 112 path has a relatively low latency of 1 millisecond (ms) and that the uplink data 114 path has a relatively high latency of 10 milliseconds, as illustrated in FIG. 1. In this scenario, there is at least a one millisecond delay in client 108(1) detecting increased congestion on shared communication link 102, and there is also at least a ten-millisecond delay in application 110 receiving a message from client 108(1) notifying the application of the congestion increase. Consequently, application 110 will be unable to react to increased congestion on shared communication link 102 for at least 11 milliseconds, which may significantly impair operation of client 108(1) by causing delay in, or complete failure of, data structure transmission between client 108(1) and application 110.

Disclosed herein are systems and methods for reducing communication network performance degradation using in-band telemetry data which may at least partially overcome one or more of the drawbacks discussed above. Certain embodiments include an analytics engine that is capable of detecting performance degradation in at least a portion of a communication network, such as manifested by excessive data structure queuing and/or excessive data transmission latency, without waiting for a data structure to traverse a high-latency communication link. Consequently, communication networks including the new analytics engines can respond to communication network performance degradation more-quickly than is possible when using conventional techniques. Certain embodiments of the new analytics engines are capable of detecting communication network performance degradation from telemetry data that is based on in-band telemetry data of data structures flowing through the communication network. Consequently, the analytics engines can advantageously be located upstream of a high-latency communication link, which helps prevent delays in the communication network responding to communication link performance degradation. Furthermore, some embodiments of the analytics engines are capable of detecting communication network characteristics other than, or in addition to, performance degradation. For example, particular embodiments are configured to detect one or more communication network characteristics which can be used to help optimize the communication network, such as by (1) changing the communication network's topology, (2) changing configuration of one or more elements of the communication network, and/or (3) changing resources, e.g. computing resources and/or communication resources, allocated to one or more portions of the communication network.

In this document, "in-band telemetry information" refers to telemetry information transmitted in a data structure, such as in a header or footer of the data structure, where the data structure is not dedicated to carrying the telemetry information. For example, telemetry information may be transmitted in-band by embedding the telemetry information in headers or footers of data structures carrying content data. Out-of-band telemetry information, in contrast, refers to telemetry information transmitted in a data structure that is dedicated to carrying the telemetry information. Examples of in-band telemetry data include, but are not limited to, the items discussed below with respect to Tables 1-4.

Figure 2:
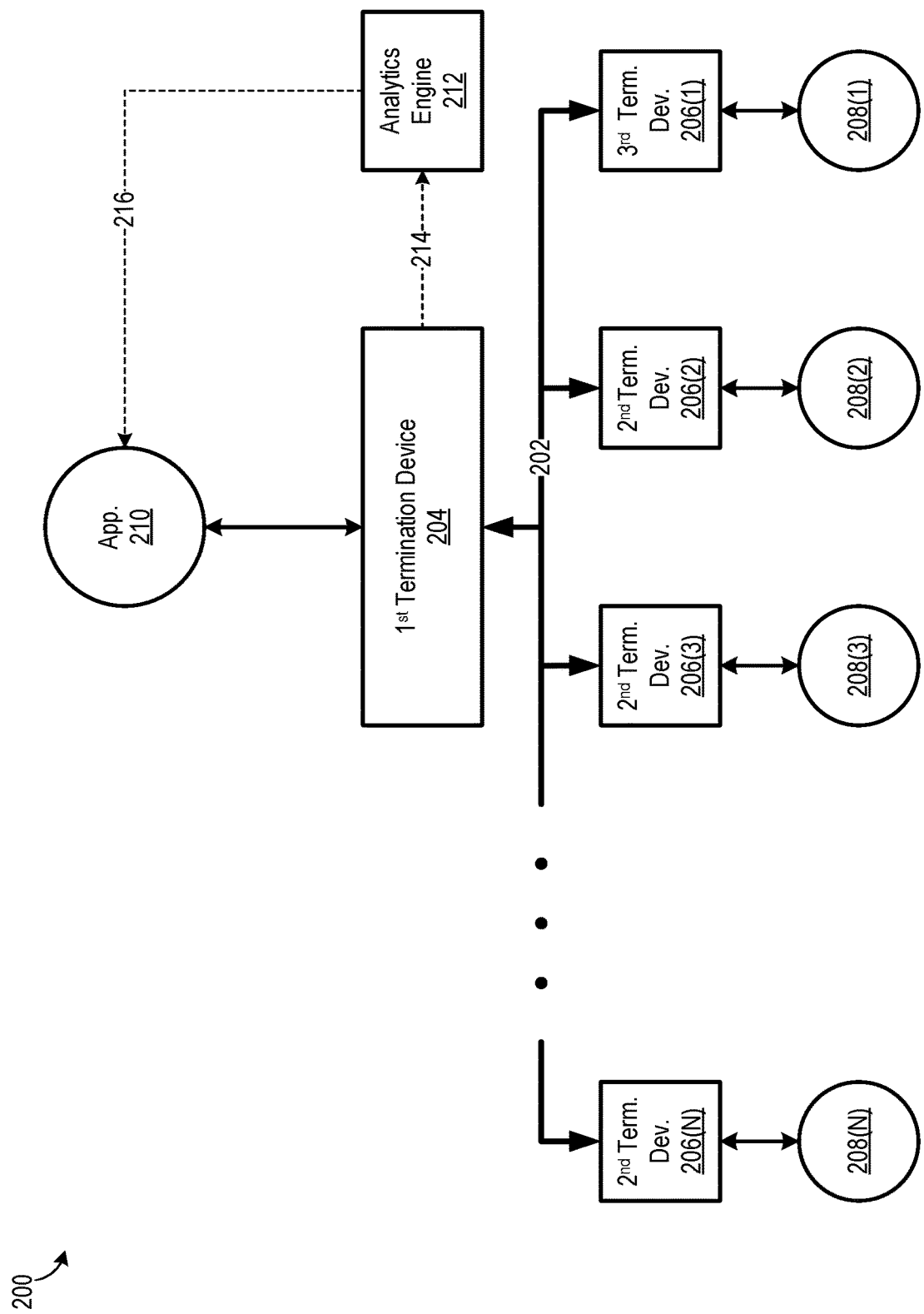
FIG. 2 is a schematic diagram of a communication network including a shared communication link and an analytics engine, according to an embodiment.

FIG. 2 is a schematic diagram of a communication network 200 including a shared communication link 202, a first termination device 204, N second termination devices 206, a respective client 208 communicatively coupled to each second termination device 206, an application 210 communicatively coupled to first termination device 204, and an analytics engine 212, where N is an integer greater than or equal to one. As discussed below, analytics engine 212 is an embodiment of the new analytics engines disclosed herein, and analytics engine 212 is configured to detect communication network performance degradation, e.g. congestion on shared communication link 202, from in-band telemetry data. Additionally, in some embodiments, analytics engine 202 is capable of detecting communication network characteristics other than, or in addition to, performance degradation of communication network 200, from in-band telemetry data. For example, particular embodiments of analytics engine 212 are configured to detect one or more characteristics of communication network 200 which can be used to help optimize the communication network, such as by (1) changing the communication network's topology, (2) changing configuration of one or more elements of the communication network, and/or (3) changing resources, e.g. computing resources and/or communication resources, allocated to one or more portions of the communication network.

Shared communication link 202 transports data between first termination device 204 and each second termination device 206. Accordingly, shared communication link 202 is shared by clients 208. In some embodiments, shared communication link 202 includes one or more of a coaxial electrical cable, a twisted-pair electrical cable, a fiber optic cable, a free space optical communication link, and a wireless communication link (e.g. a fourth generation (4G) wireless communication link, a 5G wireless communication link, a sixth generation (6G) wireless communication link, a satellite communication link, a microwave communication link, and/or a Wi-Fi wireless communication link). First termination device 204 interfaces application 210 with shared communication link 202, and each second termination device 206 interfaces its respective application 208 with shared communication link 202. Although shared communication link 202 is depicted as a single element, shared communication link 202 could include multiple elements. For example, in some embodiments, shared communication link 202 includes (a) a fiber optic cable, (b) a coaxial electrical cable, and (c) a fiber node interfacing the fiber optic cable with the coaxial electrical cable. As another example, in some embodiments, shared communication link 202 includes (a) a fiber optic cable, (b) a wireless communication link, and (c) a transceiver interfacing the fiber optic cable with the wireless communication link.

In some embodiments, first termination device 204 includes a CMTS and each second termination device 206 includes a CM. In these embodiments, data is optionally transmitted along shared communication link 202 according to a Data Over Cable Service Interface Specification (DOCSIS) protocol. In some other embodiments, first termination device 204 includes an optical line terminal (OLT), and each second termination device 206 includes an optical network terminal (ONT) or an optical network unit (ONU). In these embodiments, data is optionally transmitted along shared communication link 202 according to an ethernet passive optical network (EPON) communication protocol, a radio frequency over glass (RFOG) communication protocol, or a gigabit passive optical network (GPON) communication protocol. In some other embodiments, first termination device 204 includes a wireless base station (e.g. an evolved NodeB (eNB), a next generation NodeB (gNB), an Institute of Electrical and Electronics Engineers (IEEE) 802.11-based wireless access point, an Integrated Access and Backhaul (IAB) access point, a microcell, a picocell, a femtocell, a macrocell, a IEEE 802.11-based application, a satellite communication device, etc.), and each second termination device 206 includes a wireless transceiver. In these embodiments, data is optionally transmitted along shared communication link 202 according to a 4G protocol, a 5G protocol, a Wi-Fi protocol, or a satellite protocol.

Application 210 is configured to exchange data with one or more clients 208. In some embodiments, application 210 is at least partially embodied by hardware, and in some embodiments, application 210 is embodied at least partially by a computing processing device executing non-transitory instructions, such as in the form of software or firmware, stored in a storage subsystem. First termination device 204 and application 210 could be combined without departing from the scope hereof. Each client 208 is configured to exchange data with application 210, and each client 208 need not have the same configuration. In some embodiments, one or more of clients 208 are at least partially embodied by hardware. Additionally, in some embodiments, one or more of clients 208 are at least partially embodied by a computing processing device executing non-transitory instructions, such as in the form of software or firmware, stored in a storage subsystem. One or more clients 208 could be combined with its respective termination device 206 without departing from the scope hereof. In some embodiments, at least one client 208 includes one or more of a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, an IEEE 802.11-based wireless access point, an IAB access point, a microcell, a picocell, a femtocell, a macrocell, IEEE 802.11-based application, a satellite communication device, etc).

Analytics engine 212, for example, is implemented by analog electronics and/or digital electronics. In some embodiments, analytics engine 212 is at least partially implemented by a computing processing device executing non-transitory instructions, such as in the form of software or firmware, stored in a storage subsystem. Two or more of the elements of communication network 200 could be implemented by common infrastructure. For example, in some embodiments, two or more of analytics engine 212, first termination device 204, and application 210 are implemented by respective containers or virtual machines in common computing infrastructure. As another example, in particular embodiments, two or more of analytics engine 212, first termination device 204, and application 210 are implemented by respective kernels of a field-programmable gate array (FPGA) or a graphics processing unit (GPU).

Communication network 200 could be modified without departing from the scope herein, as long as communication network 200 includes at least one instance of analytics engine 212. For example, communication network 200 could include a different number of second termination devices 206, and as another example, communication network 200 could include additional applications communicatively coupled to first termination device 204. Furthermore, communication network 200 could include additional elements, such as amplifiers, repeaters, splitters, taps, translators, buffers, analog-to-digital converters, digital-to-analog converters, power inserters, transceivers, etc. coupled to shared communication medium 202, as well as additional elements, such as routers, switches, gateways etc. that are not necessarily directly coupled to shared communication medium 202. Moreover, communication network 200 could include one or more additional analytics engines. Furthermore, analytics engine 212 could be combined with first termination device 204 or application 210, or analytics engine 212 could be distributed among multiple elements of communication network 200. Additionally, communication network 200 could include additional communication links, such as another shared communication link and/or a dedicated communication link.

Analytics engine 212 receives data structures 214, e.g. data frames or data packets, from first termination device 204. Data structures 214 include telemetry data based on in-band telemetry data of data structures passing through first termination device 204. In some embodiments, data structures 214 are a copy of some or all of data structures passing through first termination device 204. In some other embodiments, data structures 214 are related to, but not identical to, some or all of data structures passing through first termination device 204. For example, in some embodiments, data structures 214 include in-band telemetry data, but not payload, of data structures passing through first termination device 204. As another example, in some embodiments, data structures 214 include a summary of at least some in-band telemetry data of data structures passing through first termination device 204. In certain embodiments, data structures 214 include, or are related to, downlink data structures leaving first termination device 204 for shared communication link 202 and/or uplink data structures entering first termination device 204 from shared communication link 202. First termination device 204 generates data structures 214, for example, by mirroring some or all data structures passing through first termination device 204, or by using a tap (e.g. an optical tap) communicatively coupled to a data transmission medium of first transmission device 204 and/or a data transmission medium connected to first termination device 204.

Analytics engine 212 is configured to detect performance degradation of communication network 200, e.g. congestion on shared communication link 202, insufficient throughput in one or more portions of communication network 200, excessive queue depth at one or more portions of communication network 200, and/or excessive errors in one or more portions of communication network 200, from telemetry data in data structures 214. For example, in some embodiments, analytics engine 212 is configured to detect congestion on shared communication link 202 in response to data queue status, as indicated by in-band telemetry data, exceeding a threshold value. As another example, in some embodiments, analytics engine 212 is configured to detect congestion on shared communication link 202 in response to a difference in time stamps, as indicated by in-band telemetry data, exceeding a threshold value. As another example, in certain embodiments, analytics engine 212 is configured to detect performance degradation of communication network 200 from other in-band telemetry data, such as from one or more of the items in Tables 1-4 below. Furthermore, in some embodiments, analytics engine 212 is capable of detecting communication network characteristics other than, or in addition to, performance degradation, from data structures 214.

Analytics engine 212 is further to configured to communicate with application 210 regarding performance degradation of communication network 200, e.g. congestion on shared communication link 202, and/or regarding another characteristic of communication network 200, via messages 216 transmitted between analytics engine 212 and application 210. In some embodiments, analytics engine 212 is configured to interface with first termination device 204 and/or application 210 at least partially via computer code written in a Programming Protocol-independent Packet Processors (P4) computer language.

In certain embodiments, analytics engine 212 is configured to send one or more messages 216 to application 210 in response to analytics engine 212 detecting performance degradation of communication network 200, e.g. congestion on shared communication link 202, and/or in response to analytics engine 212 detecting another characteristic of communication network 200. Messages 216, for example, notify application 210 of congestion on shared communication link 202. In some embodiments, analytics engine 212 is configured to send messages 216 from time-to-time, such as on a periodic basis, where each message 216 indicates congestion status of shared communication link 202 and/or other performance degradation of communication network 200. In particular embodiments, if there is no significant change in congestion or other operating parameter on shared communication link 202 since a previous message 216 was sent, message 216 indicates that there is no change in congestion or the other operating parameter. Additionally, in some embodiments, analytics engine 212 is configured to send a message 216 in response to a request from application 210, such as in response to a polling request from application 210. Furthermore, in some embodiments, analytics engine 212 is configured to send messages 216 to first termination device 204 via an application programming interface (API) which allows application 210, and optionally additional or alternative applications, to access one or more aspects of analytics engine 212. For example, an operator of analytics engine 212 could allow a third party to access data of analytics engine 212, such as in exchange for compensation, via an API of analytics engine 212.

In certain embodiments, application 210 responds to congestion or other communication network 200 performance degradation indicated by a message 216 by reducing rate of data transmission between application 210 and one or more clients 208, thereby reducing rate of data transmission through shared communication link 202. For example, application 210 may increase compression of data transmitted between application 210 and one or more clients 208, and/or application 210 may decrease throughput of data transmission between application 210 and one or more clients 208. It should be appreciated that the fact that analytics engine 212 is located upstream of shared communication link 202, from a standpoint of application 210, enables analytics engine 212 to communicate with application 210 without traversing shared communication link 202. Consequently, analytics engine 212 can communicate detection of congestion on shared communication link 202, and/or other performance degradation of communication network 200, more quickly than is feasible when using traditional techniques. Additionally, in some embodiments, analytics engine 212 is configured to detect congestion on shared communication link 202, and/or other performance degradation of communication network 200, that is associated with multiple instances of client 208, thereby giving analytics engine 212 insight on complete operation of shared communication link 202, which analytics engine 212 can communicate to application 210 via messages 216.

Application 210 is not limited to reducing a data transmission rate in response to receipt of a message 216. Alternately or additionally, application 210 may be configured to take a different action in response to receipt of a message 216, including but not limited to, one or more of the following: (a) change a configuration of communication network 200, such as by using software defined network techniques, e.g. to bypass congestion on shared communication link 202, (b) add, decrease, or reallocate resources in communication network 200, e.g. to help reduce congestion or other communication network 200 performance degradation detected by analytics engine 212, or to reduce cost in response to communication network 200 having excess capacity, (c) notify a system administrator, e.g. so that the system administrator can take corrective action, (d) cause one or more clients 208 to change its operation, e.g. to mitigate impact of congestion or other communication network 200 performance degradation on the client, and (e) increase rate of data transmission between application 210 and one or more clients 208, such as in response to a message 216 indicating that communication network 200 has excesses capacity.

Figure 3:
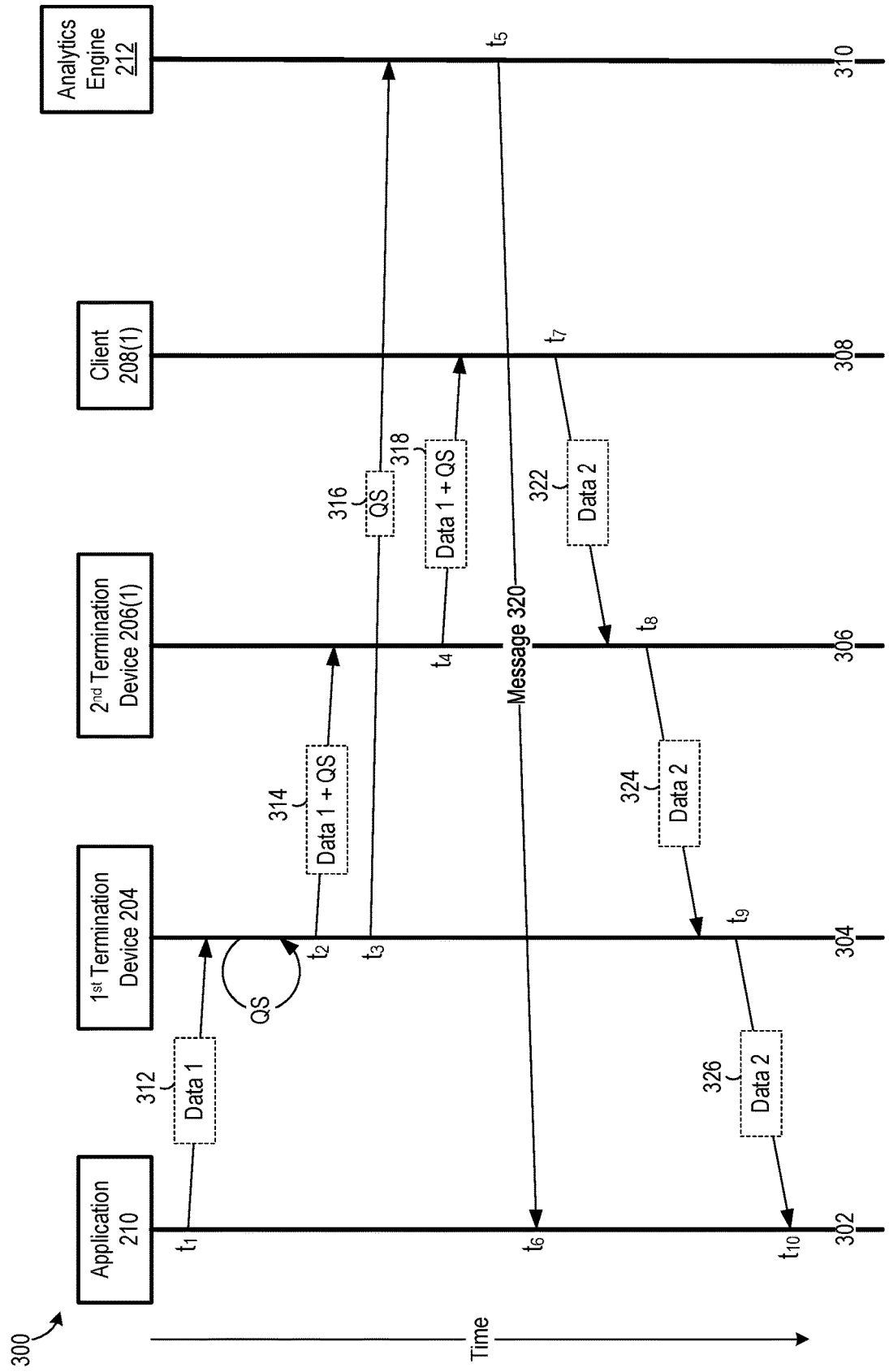
FIG. 3 is a dataflow diagram illustrating one example of operation of the FIG. 2 communication network.

FIG. 3 is a dataflow diagram 300 illustrating one example of operation of communication network 200. Vertical lines 302, 304, 306, 308, and 310 logically represent application 210, first termination device 204, second termination device 206(1), client 208(1), and analytics engine 212, respectively. At time $t_1$, application 210 sends a data structure 312 including data 1 to first termination device 204. First termination device 204 adds queue status (QS) to data structure 312 as in-band telemetry data, to generate a data structure 314. QS directly or indirectly represents an amount of data in queue to be sent from first termination device 204 to one or more second termination devices 206 via shared communication link 202. For example, QS may represent a relative or absolute number of data structures waiting to be transmitted from first termination device 204 to one or more second termination devices 206. First termination device 204 sends data structure 314 to second termination device 206(1) at time $t_2$, and first termination device 204 also sends a data structure 316 to analytics engine 212 at time $t_3$. Data structure 316 includes QS, and data structure 316 is an embodiment of data structures 214 of FIG. 2. Second termination device 206(1) sends a data structure 318 including data 1 and QS to client 208(1) at time $t_4$.

Analytics engine 212 determines from QS that shared communication link 202 is experiencing excessive latency. For example, in some embodiments, analytics engine 212 determines that shared communication link 202 is experiencing excessive latency in response to a value of QS exceeds a threshold value. As another example, in certain embodiments, analytics engine 212 determines that shared communication link 202 is experiencing excessive latency in response to QS being set to, or being equal to, a predetermined value. Analytics engine 212 sends a message 320 to application 210 in response to determining that shared communication link 202 is experiencing excessive latency. Message 320 is an embodiment of message 216 of FIG. 2, and message 320 directly or indirectly indicates that shared communication link 202 is experiencing excessive latency.

Client 208(1) sends a data structure 322 including data 2 to second termination device 206(1) at time $t_7$, and second termination device 206(1) sends a data structure 324 including data 2 to first termination device 204 at time $t_8$. First termination device 204 sends a data structure 326 to application 210 at time $t_9$. It should be noted that application 210 receives message 320 at time to significantly before application 210 receives data structure 326 at time $t_{10}$, thereby illustrating how analytics engine 212 helps quickly notify application 210 of congestion on shared data link 202.

Figure 4:
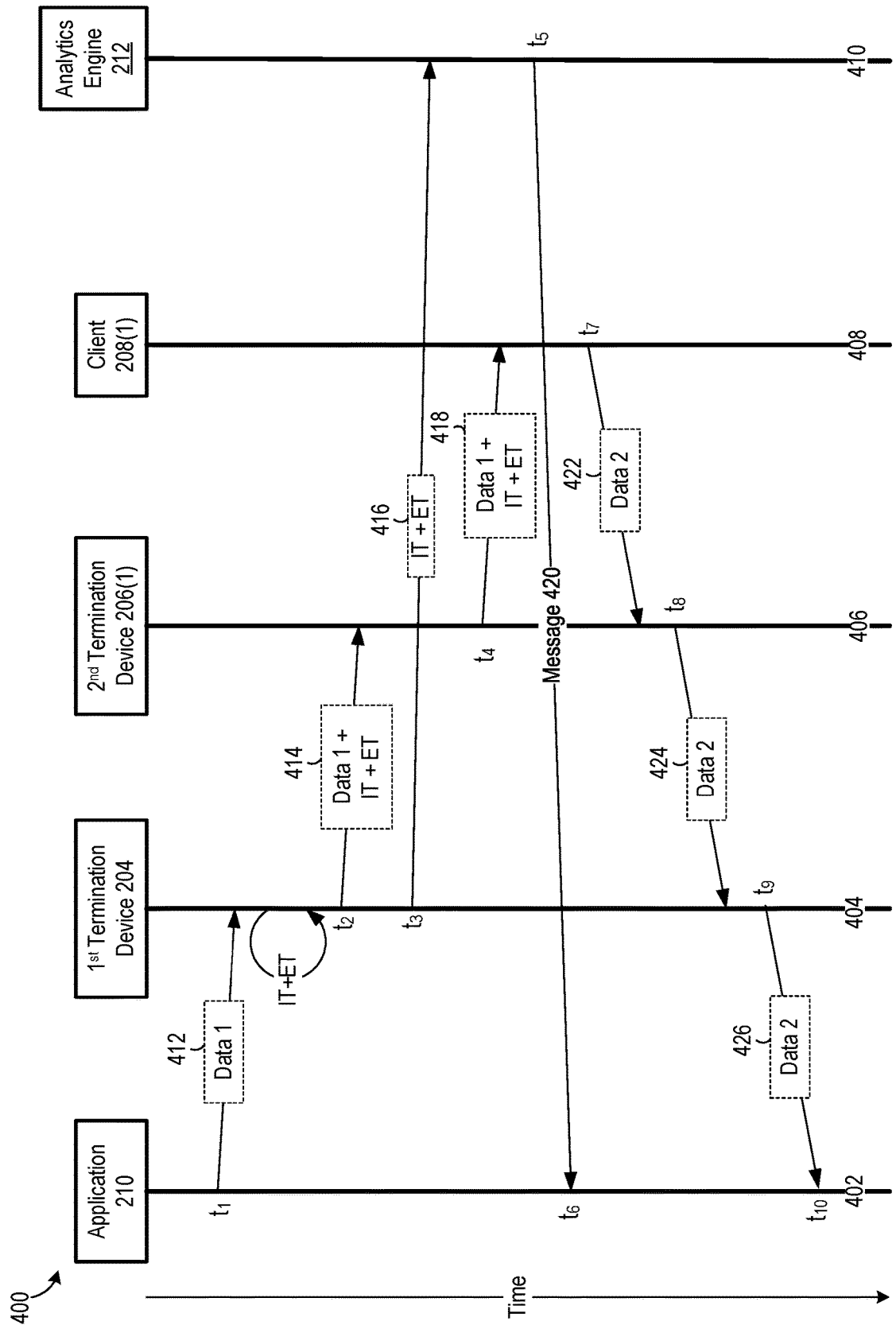
FIG. 4 is a dataflow diagram illustrating another example of operation of the FIG. 2 communication network.

FIG. 4 is a dataflow diagram 400 illustrating another example of operation of communication network 200. Vertical lines 402, 404, 406, 408, and 410 in FIG. 4 logically represent application 210, first termination device 204, second termination device 206(1), client 208(1), and analytics engine 212, respectively. At time $t_1$, application 210 sends a data structure 412 including data 1 to first termination device 204. First termination device 204 adds an ingress time (IT) and an egress time (ET) to data structure 412 as in-band telemetry data, to generate a data structure 414. IT represents a time when data structure 412 arrived at first termination device 204, and ET represents a time when data structure 414 will depart first termination device 204. First termination device 204 sends data structure 414 to second termination device 206(1) at time $t_2$, and first termination device 204 also sends a data structure 416 to analytics engine 212 at time $t_3$. Data structure 416 includes IT and ET, and data structure 416 is an embodiment of data structures 214 of FIG. 2. Second termination device 206(1) sends a data structure 418 including data 1, IT, and ET to client 208(1) at time $t_4$.

Analytics engine 212 determines from IT and ET that shared communication link 202 is experiencing excessive latency. For example, in some embodiments, analytics engine 212 determines that shared communication link 202 is experiencing excessive latency in response to a difference between ET and IT exceeding a threshold value. Analytics engine 212 sends a message 420 to application 210 in response to determining that shared communication link 202 is experiencing excessive latency. Message 420 is an embodiment of message 216 of FIG. 2, and message 420 directly or indirectly indicates that shared communication link 202 is experiencing excessive latency.

Client 208(1) sends a data structure 422 including data 2 to second determination device 206(1) at time $t_7$, and second termination device 206(1) sends a data structure 424 including data 2 to first termination device 204 at time $t_8$. First termination device 204 sends a data structure 426 to application 210 at time $t_9$. It should be noted that application 210 receives message 420 at time $t_6$ significantly before application 210 receives data structure 426 at time $t_{10}$, thereby illustrating how analytics engine 212 helps quickly notify application 210 of congestion on shared data link 202.

Figure 5:
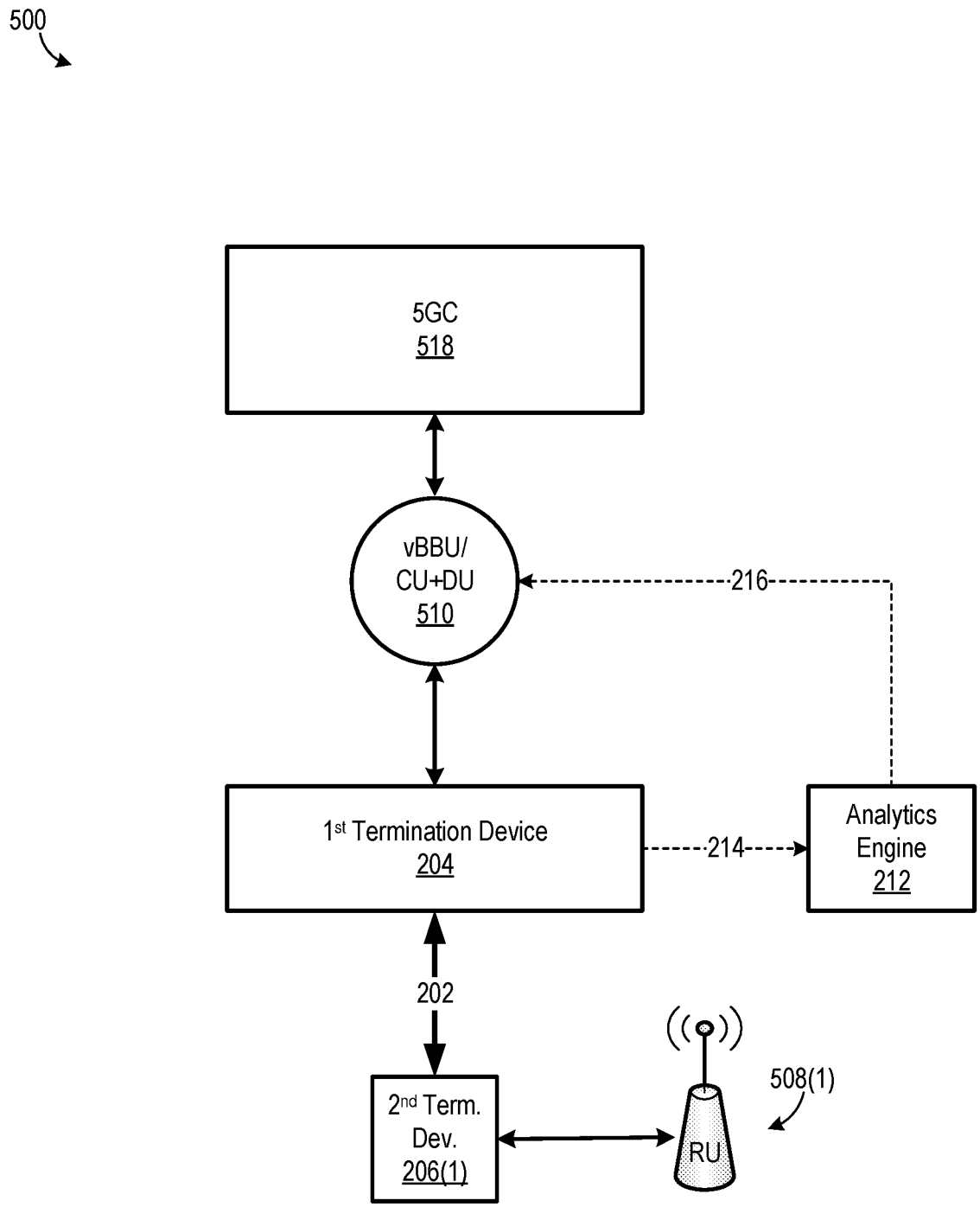
FIG. 5 is a schematic diagram of an embodiment of the FIG. 2 communication network that is configured to support 5G wireless communication.
Figure 6:
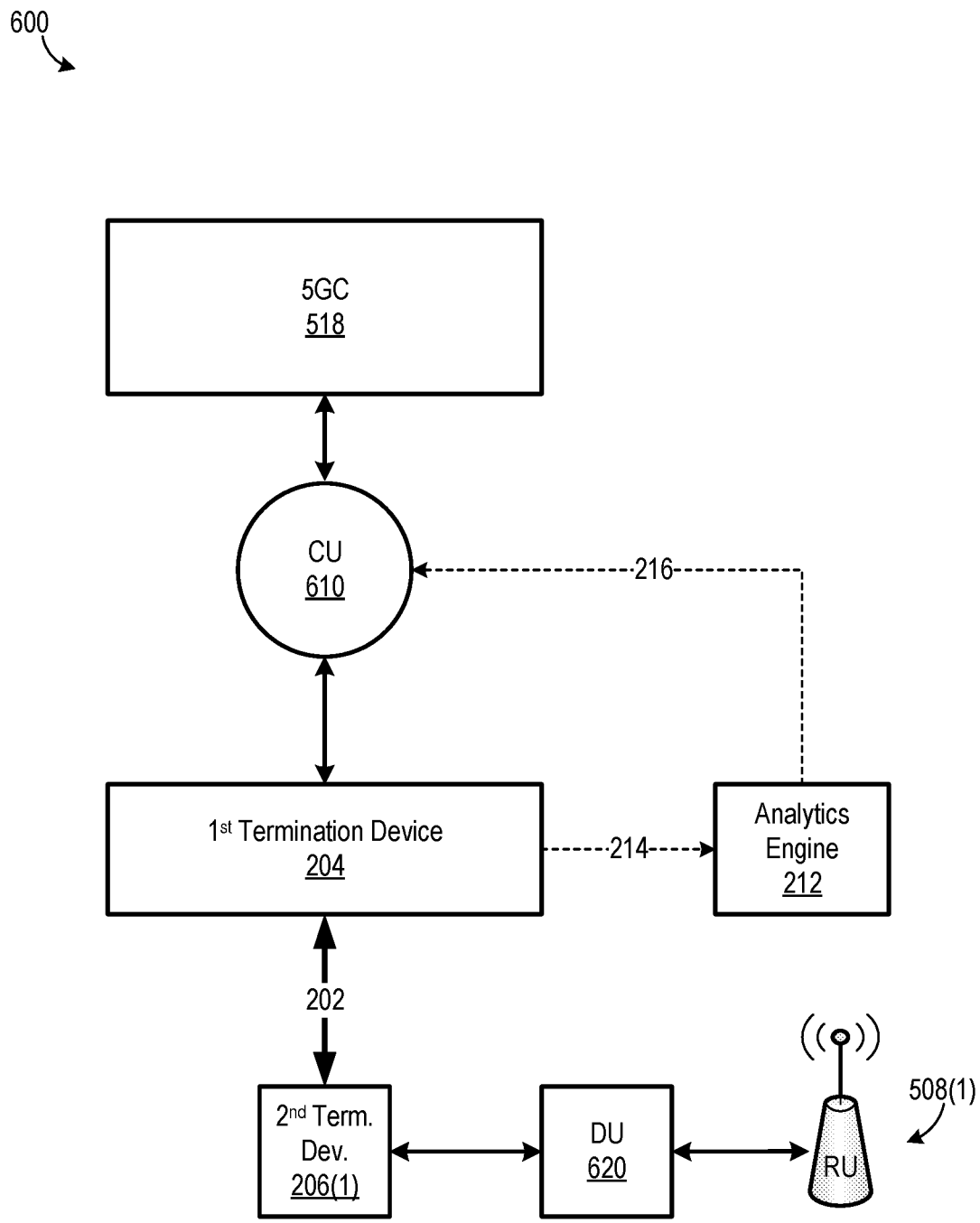
FIG. 6 is a schematic diagram of an alternate embodiment of the FIG. 5 communication network.
Figure 7:
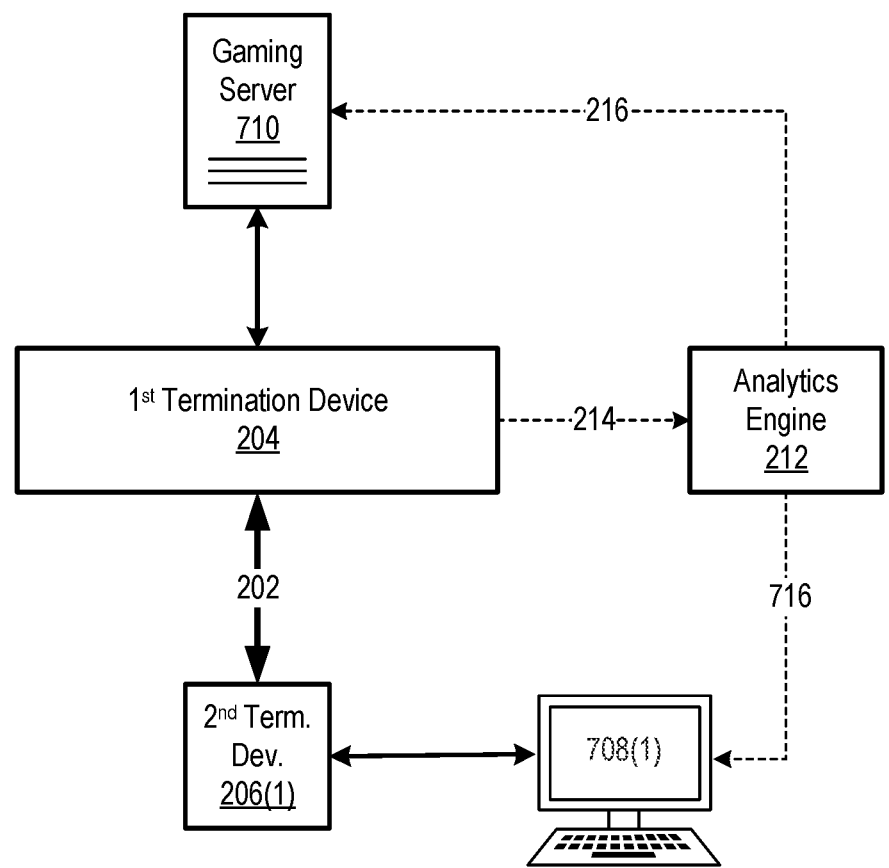
FIG. 7 is a schematic diagram of an embodiment of the FIG. 2 communication network that is configured to support gaming.

FIGS. 5-7 illustrate several example embodiments of communication network 200. It is understood, however, that communication network 200 is not limited to these example embodiments.

FIG. 5 is a schematic diagram of a communication network 500, which is an embodiment of communication network 200 configured to support 5G wireless communication. In communication network 500, application 210 is embodied by a virtual base band unit (vBBU) 510, and client 208(1) is embodied by a radio unit (RU) 508(1). Communication network 500 further includes a 5G core (5GC). Only one second termination device 206, i.e. second termination device 206(1), and only a portion of shared communication link 202, are shown in FIG. 5 for illustrative clarity.

vBBU 510 and RU 508(1) collectively form a 5G radio access network (RAN). vBBU 510 includes a central unit (CU) and a distribution unit (DU). The central unit processes non-real-time protocols and services, and the distribution unit processes physical (PHY) level protocols and real-time services. RU 508(1) performs, for example, conversion between analog and digital domains, filtering, amplification, transmission, and reception. First termination device 204, shared communication link 202, and second termination device 206(1) collectively transmit data between vBBU 510 and RU 508(1). RU 508(1) is sensitive to latency, but analytics engine 212 is advantageously capable of notifying vBBU 510 of congestion on shared communication link 202 via messages 216, such as using one or more of the techniques discussed above with respect to FIGS. 2-4. vBBU 510 responds to congestion indicated by messages 216, for example, by decreasing data transmission throughput between vBBU 510 and RU 508(1), and/or by increasing compression of data transmitted between vBBU and Ru 508(1), thereby reducing rate of data transmission through shared communication link 202.

Communication network 500 could be modified without departing from the scope hereof. For instance, communication network 500 could be modified to support an alternative or additional wireless communication type, including but not limited to 4G, 6G, Wi-Fi, microwave, satellite, free space optical, etc. Additionally, communication network 500 could modified to have a different split between elements. For example, FIG. 6 is a schematic diagram of a communication network 600, which is an alternate embodiment of communication network 500 where vBBU 510 is replaced with a CU 610 and a DU 620. CU 610 is upstream of shared communication link 202 and is accordingly an embodiment of client 210 of FIG. 2. DU 620 is located downstream of shared communication link 202, and DU 620 and RU 508(1) accordingly collectively form an embodiment of client 208(1) of FIG. 2. CU 610 is configured to respond to messages 216 from analytics engine 212 indicating congestion on shared communication link 202 by decreasing rate of data transfer between CU 610 and RU 508(1), thereby decreasing rate of data transfer through shared communication link 202.

FIG. 7 is a schematic diagram of a communication network 700, which is an embodiment of communication network 200 configured to support gaming. In communication network 700, application 210 is embodied by a gaming server 710, and client 208(1) is embodied by a workstation 708(1). Only one second termination device 206, i.e. second termination device 206(1), and only a portion of shared communication link 202, are shown in FIG. 7 for illustrative clarity. Gaming server 710 is configured to provide gaming services, e.g. multi-player games, to a user (not shown) of workstation 708(1). The user's gaming experience is significantly impaired by excessive latency in transmission of data between gaming server 710 and workstation 708(1). However, analytics engine 212 is advantageously capable of notifying gaming server 710 of congestion on shared communication link 202 via messages 216, such as using one or more of the techniques discussed above. Gaming server 710 responds to congestion indicated by messages 216 by decreasing rate of data transmission between gaming server 710 and workstation 708(1), such as by decreasing video frame rate and/or by decreasing video resolution. Alternately or additionally, analytics engine 212 is configured to send messages 716 to workstation 708(1) notifying workstation 708(1) of congestion on shared communication link 202. Workstation 708(1) responds to messages 716, for example, by decreasing rate of data transmission between workstation 708(1) and gaming server 710.

Figure 8:
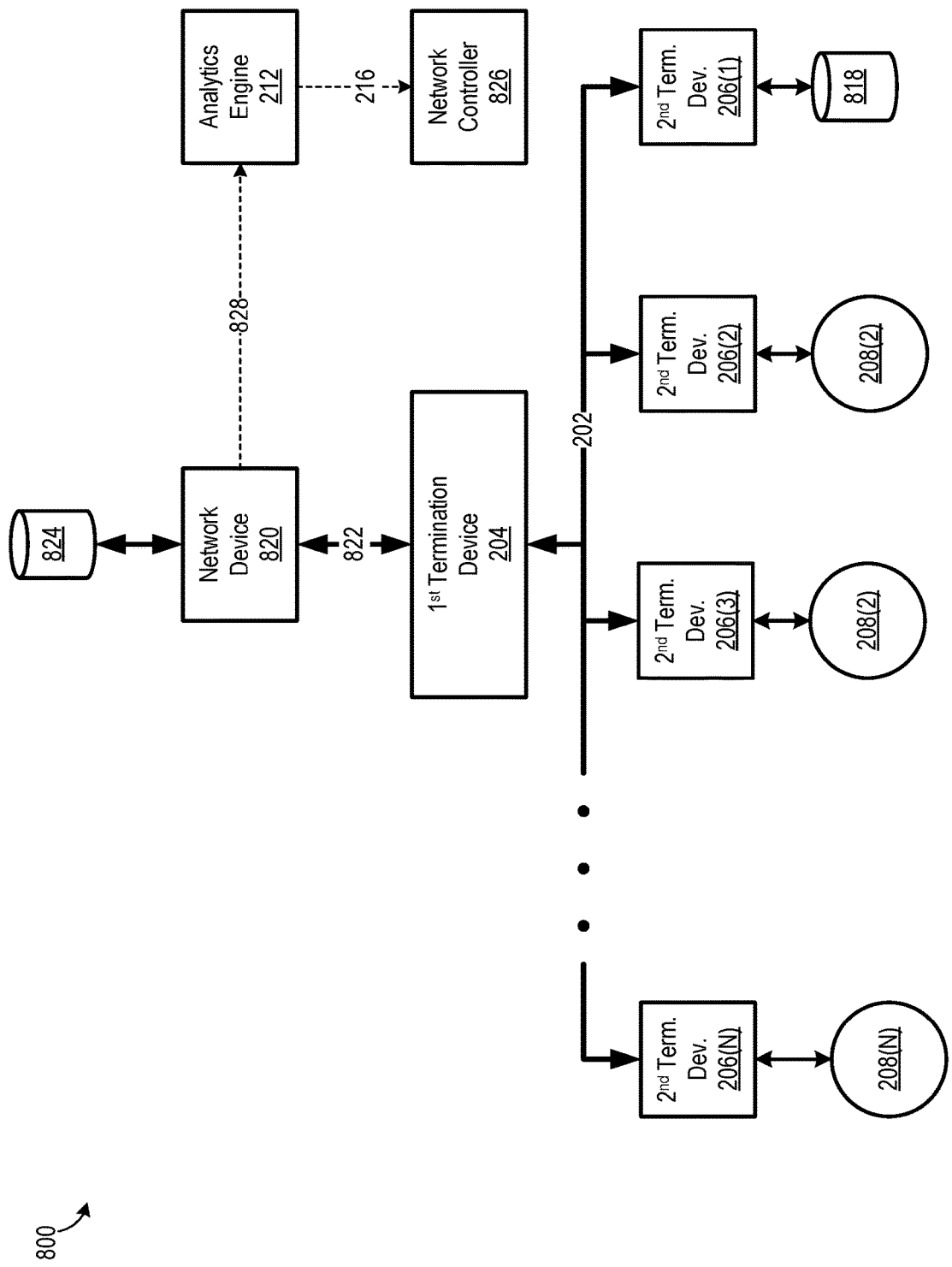
FIG. 8 is a schematic diagram of an alternate embodiment of the FIG. 2 communication network.

Analytics engine 212 is not limited to detecting an operating parameter of a shared communication link. Instead, analytics engine 212 could be used to detect congestion, or other communication network performance degradation, at essentially any hop in a communication network, from in-band telemetry data. For example, FIG. 8 is a schematic diagram of a communication network 800, which is an alternate embodiment of communication network 200 (FIG. 2) where analytics engine 212 is configured to detect congestion, or other performance degradation, on a dedicated communication link. Communication network 800 differs from communication network 200 as follows: (a) client 208(1) is replaced with a content server 818, (b) application 210 is omitted, (c) a network device 820, e.g. a router, a switch, or a gateway, is communicatively coupled to first termination device 204 via a dedicated communication link 822, (d) a content server 824 is communicatively coupled to network device 820, and (c) a network controller 826 is configured to control content servers 818 and 824. In some embodiments, content servers 818 and 824 are virtual servers that are instantiated on demand by network controller 826, such as by using software defined networking techniques, and content servers 818 and 824 therefore do not both necessarily exist at a given time. One or more of content servers 818 and 824 could be replaced by, or supplemented by, a different type of server without departing from the scope hereto.

Analytics engine 212 receives data structures 828, e.g. data frames or data packets, from network device 820. Data structures 828 include telemetry data based on in-band telemetry data of data structures passing through network device 820. In some embodiments, data structures 828 are a copy of some or all of data structures passing through network device 820. In some other embodiments, data structures 828 are related to, but not identical to, some or all of data structures passing through network device 820. For example, in some embodiments, data structures 828 include in-band telemetry information, but not payload, of data structures passing through network device 820. As another example, in some embodiments, data structures 828 include a summary of at least some in-band telemetry data of data structures passing through network device 820. Network device 820 generates data structures 828, for example, by mirroring some or all data structures passing through network device 820, or by using a tap (e.g. an optical tap) communicatively coupled to a data transmission medium of network device 820 and/or a data transmission medium connected to network device 820.

Analytics engine 212 is configured to detect congestion on dedicated communication link 822, and/or other performance degradation of dedicated communication link 822, from telemetry data in data structures 828, in a manner analogous to that discussed above with respect to FIG. 2. Analytics engine 212 is further to configured to communicate with network controller 826 regarding congestion on dedicated communication link 822, and/or other performance degradation of dedicated communication link 822, via messages 216 transmitted between analytics engine 212 and network controller 826. In some embodiments, network controller 826 is configured to change operation of one or more of content servers 818 and 824 in response to receipt of a message 216 indicating congestion on dedicated communication link 822 or other performance degradation of dedicated communication link 822. For example, consider a hypothetical scenario where content server 818 has not been instantiated and content server 824 is providing content to one or more clients 208 via dedicated communication link 822 and shared communication link 202. Now assume that analytics engine 212 detects congestion on dedicated communication link 822, and analytics engine 212 sends a message 216 to network controller 826 in response thereto. Network controller 826 may instantiate content server 818 in response to message 216, so that content server 818, instead of content server 824, provides content to one or more clients 208, thereby enabling the content to bypass congested dedicated communication link 822.

Figure 9:
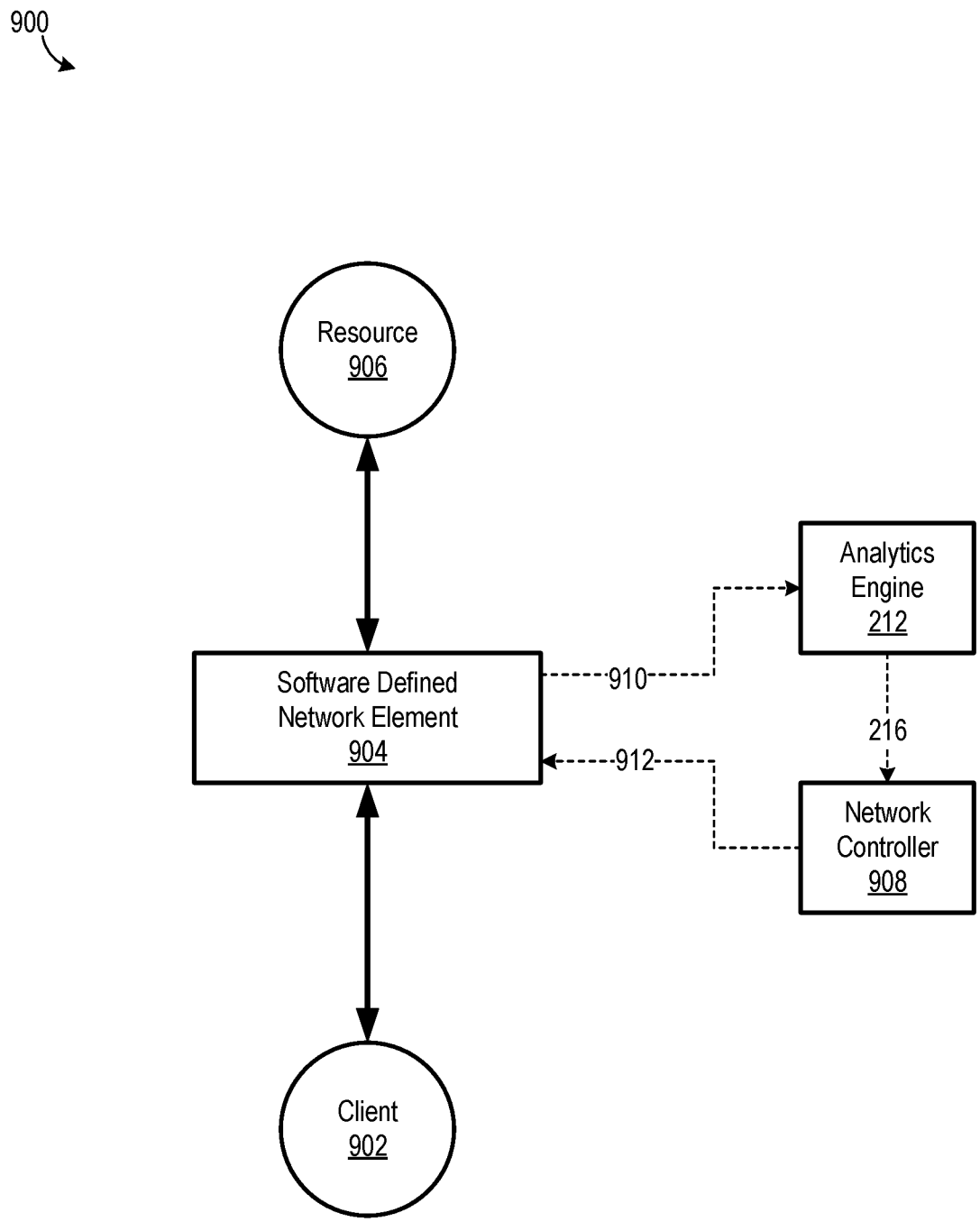
FIG. 9 is a schematic diagram of a communication network including a software defined network element and an analytics engine, according to an embodiment.

FIG. 9 is a schematic diagram of a communication network 900 including a client 902, a software defined network element 904, a resource 906, a network controller 908, and an instance of analytics engine 212. Client 902 includes, for example, a communication network, a mobile telephone, a computer, a set-top device, a data storage device, an IoT device, an entertainment device, a computer networking device, a smartwatch, a wearable device with wireless capability, a medical device, a security device, a monitoring device, and a wireless access device (including, for example, an eNB, a gNB, an IEEE 802.11-based wireless access point, an IAB access point, a microcell, a picocell, a femtocell, a macrocell, an IEEE 802.11-based application, a satellite communication device, etc).

Resource 906 is configured to provide one or more services to client 902. Resource 906 includes, for example, a communication network (e.g. the Internet or an intranet), a server (e.g. an application server, a content server, a gaming server, a data server, a communication server, etc.), a wireless transceiver (e.g. a cellular transceiver, a Wi-Fi transceiver, a satellite transceiver, etc.), an optical transceiver, a termination device, a network device, etc. Software defined networking element 904 is communicatively coupled between client 902 and resource 906. In some embodiments, software defined networking element 904 includes a software defined router, a software defined switch, a software defined gateway, etc. Network controller 908 is configured to control software defined element device 904. Communication network 900 may include additional elements without departing from the scope hereof. For example, communication network 900 may include additional network elements communicatively coupled between resource 906 and client 902.

Analytics engine 212 receives data structures 910, e.g. data frames or data packets, from software defined network element 904. Data structures 910 include telemetry data based on in-band telemetry data of data structures passing through software defined network element 904. In some embodiments, data structures 910 are a copy of some or all of data structures passing through software defined network element 904. In some other embodiments, data structures 910 are related to, but not identical to, some or all of data structures passing through software defined network element 904. For example, in some embodiments, data structures 910 include in-band telemetry information, but not payload, of data structures passing through software defined network element 904. As another example, in some embodiments, data structures 910 include a summary of at least some in-band telemetry data of data structures passing through software defined network element 904. Software defined network element 904 generates data structures 910, for example, by mirroring some or all data structures passing through software defined network element 904, or by using a tap (e.g. an optical tap) communicatively coupled to a data transmission medium of software defined network element 904 and/or a data transmission medium connected to software defined network element 904.

Analytics engine 212 is configured to detect congestion at software defined network element 904, or another operating parameter of software defined network element 904, from telemetry data in data structures 910, in a manner analogous to that discussed above with respect to FIG. 2. Analytics engine 212 is further to configured to communicate with network controller 908 regarding congestion at software defined network element 904, and/or performance characteristics at software defined network element 904, via messages 216 transmitted between analytics engine 212 and network element 908. In some embodiments, network controller 908 is configured to increase resources available to software defined network element 904 via commands 912, in response to receipt of a message 216, such as to help reduce the congestion. Additionally, in certain embodiments, network controller 908 is configured to decrease resources available to software defined network element 904 via commands 912, in response to not receiving a message 216 within a certain time frame, in response to a message 216 indicating that congestion at software defined network element 904 is below a threshold value, or in response to a message 216 indicating that communication network 900 has excess capacity.

Figure 10:
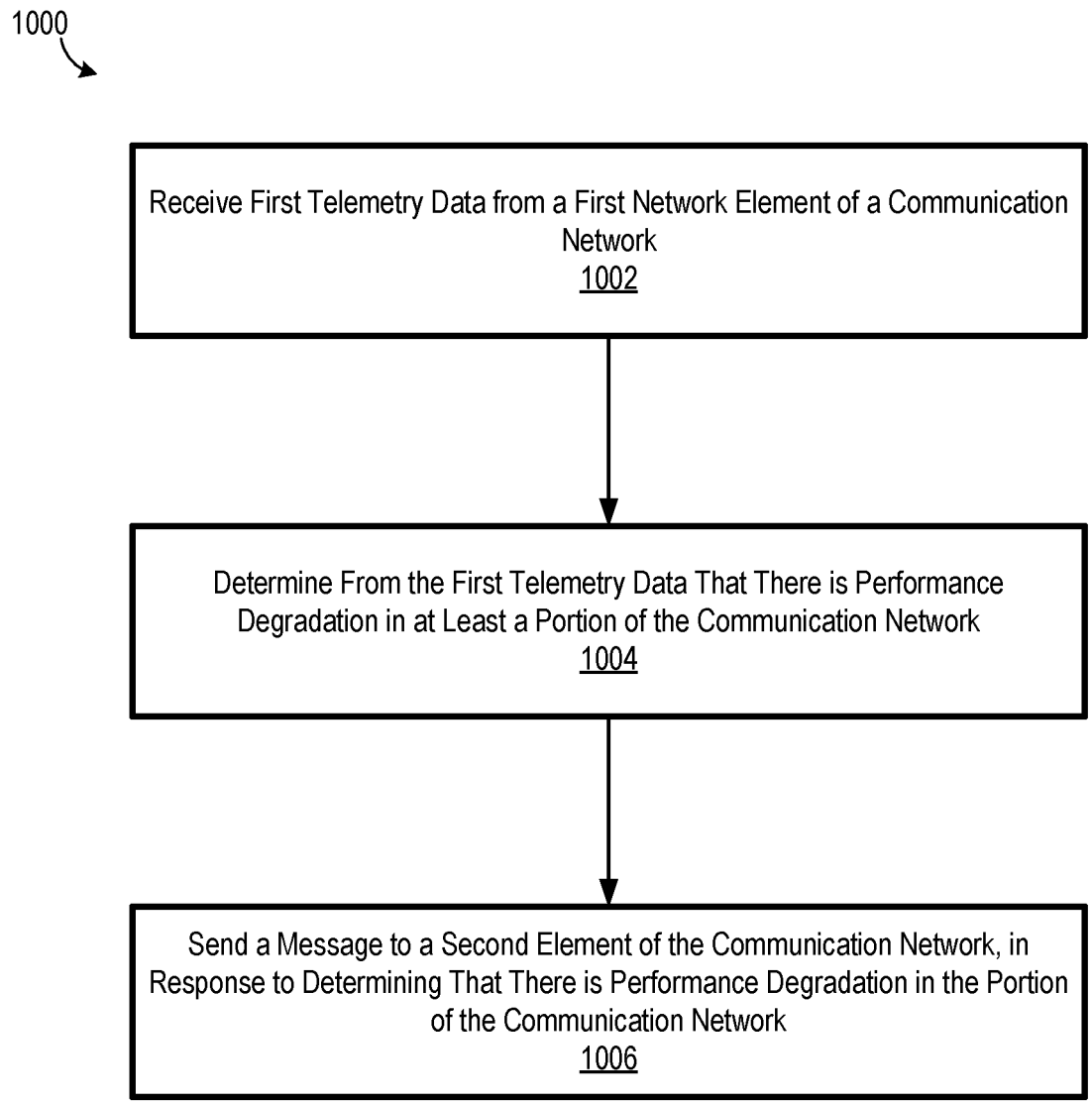
FIG. 10 is a flow chart illustrating a method for reducing communication network performance degradation using in-band telemetry data, according to an embodiment.

FIG. 10 is a flow chart illustrating a method 1000 for reducing communication network performance degradation using in-band telemetry data. In a block 1002, first telemetry data is received from a first network element of a communication network, where the first telemetry data is based on in-band telemetry data at the first network element. In one example of block 1002, analytics engine 212 receives data structures 214 from first termination device 204. In another example of block 1002, analytics engine 212 receives data structures 828 from network device 820. In yet another example of block 1002, analytics engine 212 receives data structures 910 from software defined network element 904.

In a block 1004 of method 1000, it is determined from the first telemetry data that there is performance degradation in at least a portion of the communication network. In one example of block 1004, analytics engine 212 determines from data structures 214 that there is congestion on shared communication link 202. In another example of block 1004, analytics engine 212 determines from data structures 828 that there is congestion on dedicated communication link 822. In yet another example of block 1004, analytics engine 212 determines from data structures 910 that there is congestion at software defined network element 904.

In a block 1006 of method 1000, the analytics engine sends a message to a second element of the communication network, in response to determining that there is performance degradation in the portion of the communication network. In one example of block 1006, analytics engine 212 sends a message 216 to application 210 in response to determining that there is congestion on shared communication link 202. In another example of block 1006, analytics engine 212 sends a message 216 to network controller 826 in response to determining that there is congestion on dedicated communication link 822. In yet another example of block 1006, analytics engine 212 sends a message 216 to network controller 908 in response to determining that there is congestion at software defined network element 904.

In an alternate embodiment of method 1000, an alternative network characteristic is determined in block 1004, and in block 1006, a message is sent to the second element in response to determining this alternative network characteristic. For example, in some alternate embodiments, it is determined in block 1004 that the communication network has excess capacity, and a message indicating excess network capacity is sent to the second element in block 1006.

Elements at a network hop could also be configured to use in-band telemetry data without assistance of an analytics engine, such as to help increase efficiency of data routing. For example, in a communication network including multiple paths, one or more network elements may add in-band telemetry data to some or all data structures passing through the network element. By way of example and not of limitation, the telemetry data may include one or more of the items of Tables 1-4 below. One or more of the network elements may then determine which path(s) to send data structures through at least partially according to telemetry data that is based on some or all of the in-band telemetry data. For example, a network element may to determine from in-band telemetry data that path A currently has a lower latency than parallel path B, and the network element may cause the data structure to be routed through path A in response thereto. As another example, a network element may determine from in-band telemetry data that path C is currently more robust than parallel path D. e.g. path C has a higher SNR than path D or path C has a lower number of retransmits than path D, and the network element may cause the data structure to be routed through path C in response thereto. As another example, a network element may determine from in-band telemetry data that resources allocated to a network resource should be changed, e.g. increased, decreased, or reallocated, such as in response to performance degradation of the network resource or excess capacity at the network resource.

General
   Queue depth
   Signal strength, e.g. receive signal strength and/or a transmit signal strength
   Time stamp(s), such as an ingress time stamp and/or an egress time stamp
   Identification of a network element, such as an access point identifier
   Connection type, such as IEEE 802.11, 4G, 5G (licensed and/or unlicensed), 6G, DOCSIS, EPON, GPON, RFOG, satellite, Ethernet, digital subscriber line (DSL), etc.
   Number of retransmits on a communication link
   Signal to noise ratio (SNR)
   Communication link cost of use
   Error correction information, such as forward error correction decode time and number of forward error correction processes Table 1
Wi-Fi
   Channel
   RSSI
   Rx SINR
   Channel Utilization near time of Tx
   MCS/Phy Rate
   Is part of AMPDU?
   Size of AMPDU
   Is part of AMSDU?
   Size of AMSDU
   Is Retransmission?
   Access Category Used
   MAC Delay (time from arrival at MAC queue to Tx on Channel)

AIFSN used (array showing 1st try, ReTx #1, ReTx #2, etc)
Contention Window (CW) Used (array showing 1st try, ReTx #1, ReTx #2, etc)
Actual CW Backoff chosen (array showing 1st try, ReTx #1, ReTx #2, etc)
TXOP length used
WLAN Address of any Relay/Repeater hops used
Egress queue occupancy (may be array if repeaters used in path)
Collision Count
Collision Source Address (if captured)
Number of STAs in BSS
Number of Active STAs in last time period×ms long (e.g. in last beacon interval)
MCS histogram for packets on air in last time period×ms long (e.g. in last beacon interval)

Table 2
DOCSIS
Egress queue occupancy
Egress queue dropping status? (binary)
Egress queue type (QB or NQB)?
Buffer Control Settings
Service flow ID
Service flow Scheduling type
Configured Service Flow Max Sustained Rate Limit
Configured Service Flow Peak Rate Limit
Configured Service Flow Traffic Priority
Request-Grant Delay
MAC Delay (time from arrival at MAC queue to Tx on Channel)
Whole or Partial Grant?
DOCSIS channel resource utilization
Bonding Channel Set
Channel data was sent on Table 3
LTE/5G
Egress queue Occupancy
Bearer APN
Bearer QCI
Bearer AMBR
Request—Grant Delay
Whole or Partial Grant?
LCG ID for traffic
MAC Delay (time from arrival at MAC queue to Tx on Channel)
MCS
I_TBS
Link CQI at time of Tx
RSRP of frame
RSRQ of frame
Size of Transport Block
Resource block numbers used for this data
% utilization of Physical Resource Blocks at time of Tx
Band
Component Carrier ID # of component carriers at time of Tx Table 4

Figure 11:
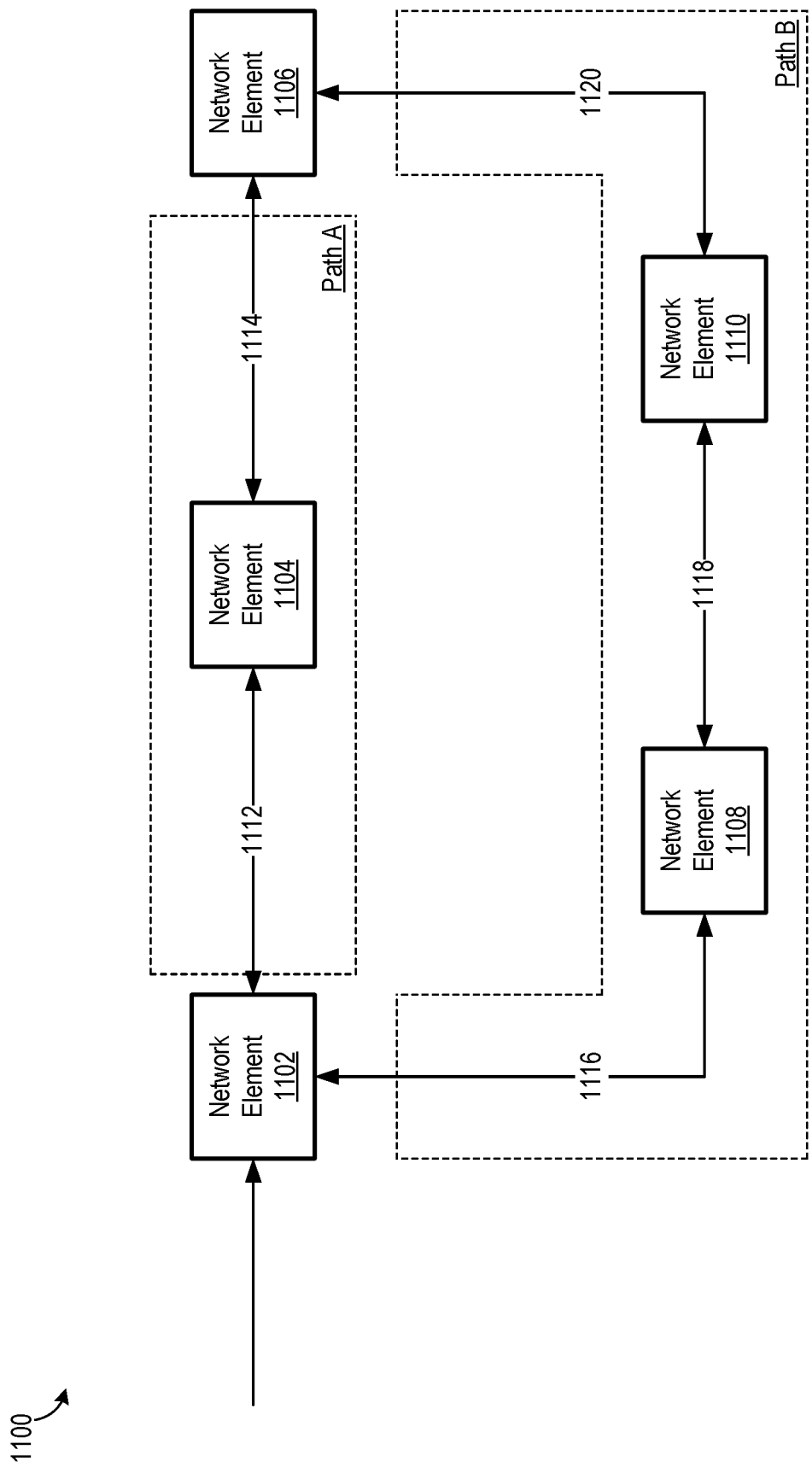
FIG. 11 is a schematic diagram of a communication network configured to use in-band telemetry data to determine data routing, according to an embodiment.

FIG. 11 is a schematic diagram of a communication network 1100, which is one embodiment of a communication network where one or more network elements are configured to use in-band telemetry data to determine data routing. Communication network 1100 includes network elements 1102, 1104, 1106, 1108, and 1110, as well as communication links 1112, 1114, 1116, 1118, 1120. Communication link 1112 communicatively couples network elements 1102 and 1104, and communication link 1114 communicatively couples network elements 1104 and 1106. Communication link 1116 communicatively couples network elements 1102 and 1108, and communication link 1118 communicatively couples network elements 1108 and 1110. Communication link 1120 communicatively couples network elements 1110 and 1106.

Each network element 1102, 1104, 1106, 1108, and 1110 includes, for example, one or more of a router, a switch, a gateway, a translator, a repeater, an amplifier, a concentrator, a splitter, a tap, a termination device, a transceiver, a wireless device (including, for example, an CNB, a gNB, an IEEE 802.11-based wireless access point, an IAB access point, a microcell, a picocell, a femtocell, a macrocell, IEEE 802.11-based application, a satellite communication device, etc), a user equipment device, etc. Each network element 1102, 1104, 1106, 1108, and 1110 need not have the same configuration. Each communication link 1112, 1114, 1116, 1118, and 1120 includes, for example, one or more of a coaxial electrical cable, a twisted-pair electrical cable (including, for example, a telephone cable or an Ethernet cable), a fiber optic cable, a free space optical communication link, and a wireless communication link (e.g. a fourth generation (4G) wireless communication link, a 5G wireless communication link, a sixth generation (6G) wireless communication link, a satellite communication link, a microwave communication link, and/or a Wi-Fi wireless communication link). Each communication link 1112, 1114, 1116, 1118, and 1120 need not have the same configuration.

Communication network 1100 includes two paths between network elements 1102 and 1106, i.e. Path A and Path B. Path A includes communication link 1112, network element 1104, and communication link 1114. Path B includes communication link 1116, network element 1108, communication link 1118, network element 1110, and communication link 1120. Communication network 1100 can include a different number of network elements and/or a different number of communication links without depart from the scope hereof. Additionally, communication network 1100 can have a different topology without departing from the scope hereof. For example, communication network 1100 could be modified to include one or more additional communication links and/or network elements, to form a third path between network elements 1102 and 1106.

Some or all of network elements 1102, 1104, 1106, 1108, and 1110 add in-band telemetry data to data structures passing therethrough, such as some or all of the telemetry data discussed above. Additionally, in some embodiments, one or more of network elements 1102, 1104, 1106, 1108, and 1110 may from time to time, e.g. periodically, transmit a data structure to another network element even if there is no data to transfer between the network elements, to evaluate alternate paths and generate associated in-band telemetry data.

Network element 1102 collects the telemetry data, such as in a telemetry table stored in a storage subsystem, from data structures passing therethrough, and network element 1102 determines whether to route data structures through Path A or Path B, or through both Path A and Path B, at least partially based on the telemetry data. For example, if network element 1102 determines from telemetry data that path B has a lower latency than Path A (even though Path B is longer than Path A), network element 1102 may, in response thereto, cause a data structure to be routed via Path B, to minimize data transmission latency. As another example, if network element 1102 determines from telemetry data that path A has a high SNR, a lower number of retransmits, or a lower cost of use than Path B, network element 1102 may, in response thereto, cause a data structure to be transmitted via Path A. As yet another example, if network element 1102 determines from telemetry data that Paths A and B have the same latency within a predetermined tolerance range, network element 1102 may, in response thereto, cause data structures to be transmitted via Paths A and B in parallel, to maximize data transmission throughput. One or more other network elements of communication network 1100 in addition to network element 1102, or in place of network element 1102, could be configured to determine which path to use for routing data structures at least partially based on in-band telemetry data.

Furthermore, some embodiments of communication network 1100 are configured to take action other than, or in addition to, determining data structure routing from in-band telemetry data. For example, some embodiments of communication network 1100 are configured to change (increase or decrease) number of paths between network elements 1102 and 1106 from in-band telemetry data. As another example, some embodiments of communication network 1100 are configured to change (increase, decrease, or reallocate) resources allocated to one or more network elements from in-band telemetry data.

Figure 12:
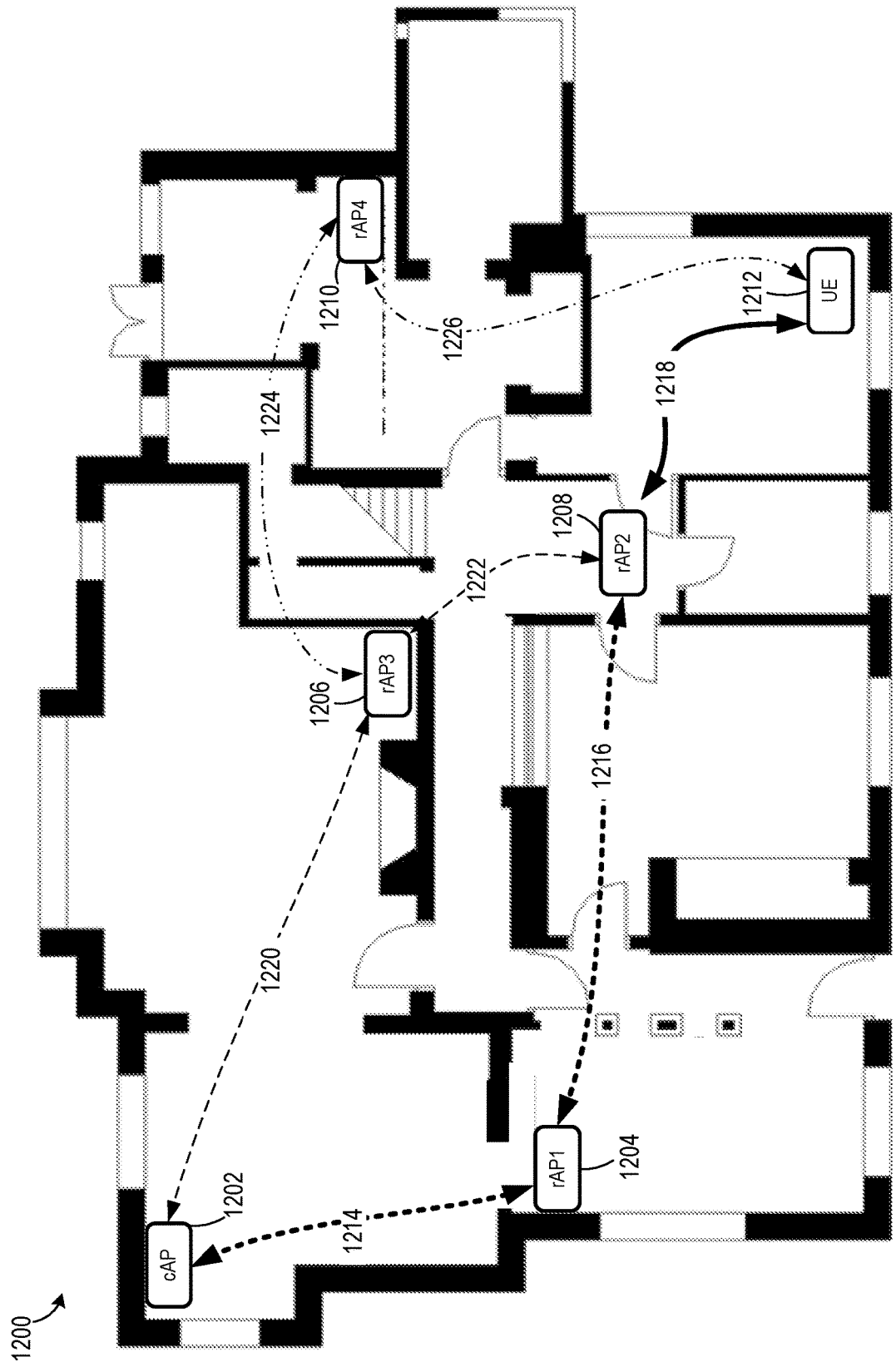
FIG. 12 is a schematic diagram of one embodiment of the FIG. 11 communication network configured as a wireless communication network.

FIG. 12 is a schematic diagram of a communication network 1200, which is one embodiment of communication network 1100 configured as a wireless communication network and including the following six network elements: (a) a central wireless access point 1202. (b) remote wireless access points 1204, 1206, 1208, and 1210, and (c) a UE device 1212. Communication network 1200 is a mesh network in a building, as shown by a building floor plan in FIG. 12. Central wireless access point 1202, for example, connects to another communication network, such as the Internet or an intranet. UE device 1212 connects to the other network via central access point 1202 and one or more of remote access points 1204, 1206, 1208, and 1210. Remote access points 1204, 1206, 1208, and 1210 operate as wireless repeaters. In some embodiments, communication network 1200 operates according to a Wi-Fi protocol, a 4G wireless protocol, a 5G new radio (NR) protocol (licensed and/or unlicensed), or a 6G wireless protocol.

Arrow 1214 represents a wireless communication link between central wireless access point 1202 and remote wireless access point 1204, and arrow 1216 represents a wireless communication link between remote wireless access point 1204 and remote wireless access point 1208. Arrow 1218 represents a wireless communication link between remote wireless access point 1208 and UE device 1212, and arrow 1220 represents a wireless communication link between central wireless access point 1202 and remote wireless access point 1206. Arrow 1222 represents a wireless communication link between remote wireless access point 1206 and remote wireless access point 1208, and arrow 1224 represents a wireless communication link between remote wireless access point 1206 and remote wireless access point 1210. Arrow 1226 represents a wireless communication link between remote wireless access point 1210 and UE device 1212.

Wireless communication link strength is proportional to arrow thickness in FIG. 12. For example, wireless communication link 1218 is the strongest wireless communication link in FIG. 12, and wireless communication links 1224 and 1226 are the weakest wireless communication links in FIG. 12. Accordingly, the strongest path between central wireless access point 1202 and UE device 1212 under the conditions of FIG. 12 is via wireless communication links 1214, 1216, and 1218.

Each of remote access points 1204, 1206, 1208, and 1210 adds in-band telemetry data, such as some or all of the telemetry data discussed above, to data structures passing therethrough. Additionally, in some embodiments, one or more of remote access points 1204, 1206, 1208, and 1210 may from time to time, e.g. periodically, transmit a data structure to another network element even if there is no data to transfer between the network elements, to evaluate alternate paths and generate associated in-band telemetry data. Central wireless access point 1202 updates a telemetry table from the in-band telemetry data, such as to determine to a path between central wireless access point 1202 and UE device 1212 having a lowest latency. Central wireless access point 1202 causes data to be transferred between central wireless access point 1202 and UE device 1212 via a path having a lowest latency, as determined from the telemetry table.

Figure 13:
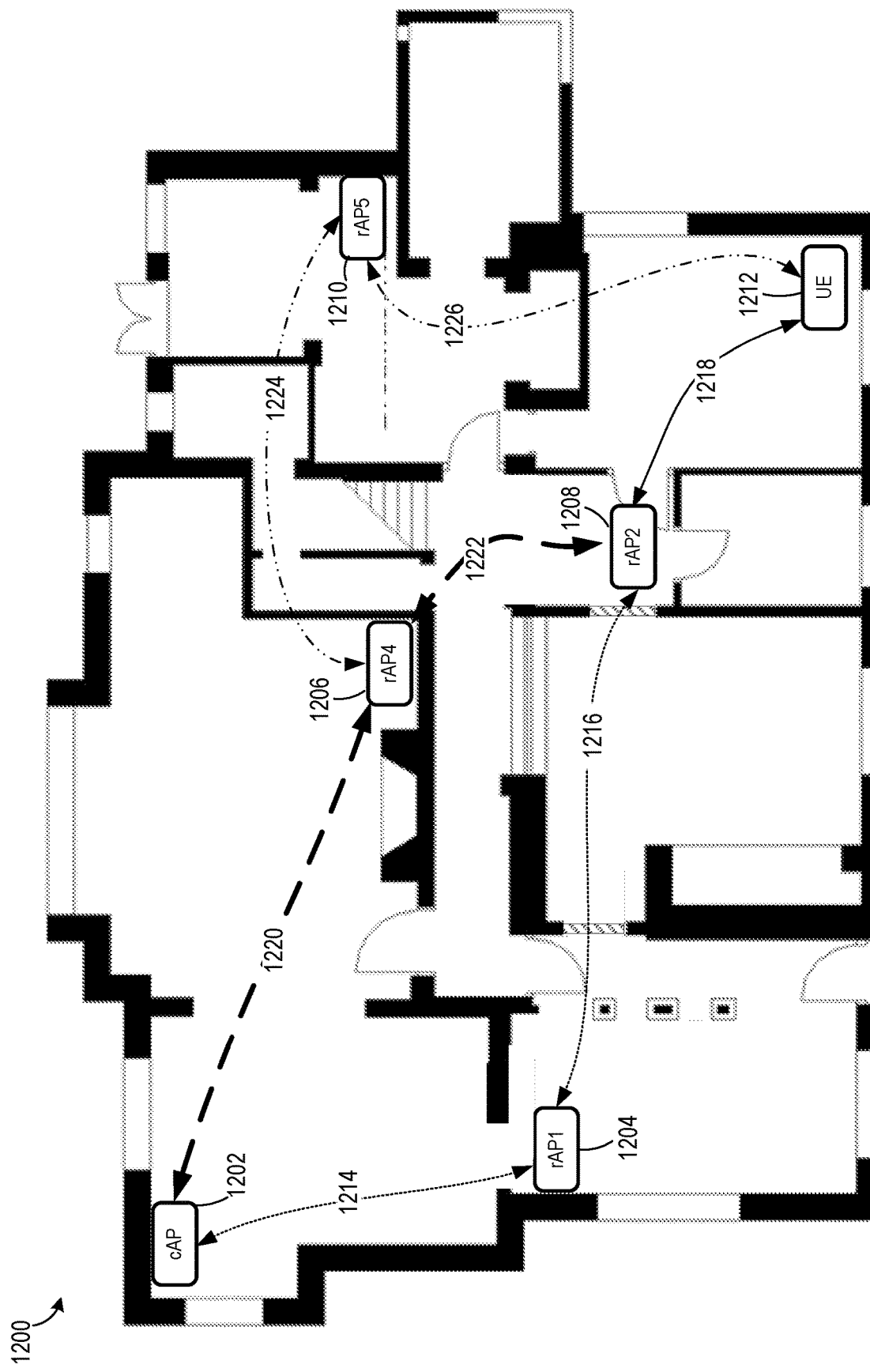
FIG. 13 is a schematic diagram of the FIG. 12 communication network under different operating conditions than those of FIG. 12.

FIG. 13 is a schematic diagram of communication network 1200 under different operation conditions than those depicted in FIG. 12, i.e. with two doors closed such that wireless communication link 1216 is degraded. Consequently, the strongest path between central wireless access point 1202 and UE device 1212 is via wireless communication links 1220, 1222, and 1218, under the conditions of FIG. 13. Central wireless access point 1202 updates the telemetry table from in-band telemetry data, such that the telemetry table reflects a path through remote wireless access points 1206 and 1208 as having a lowest latency.

Figure 14:
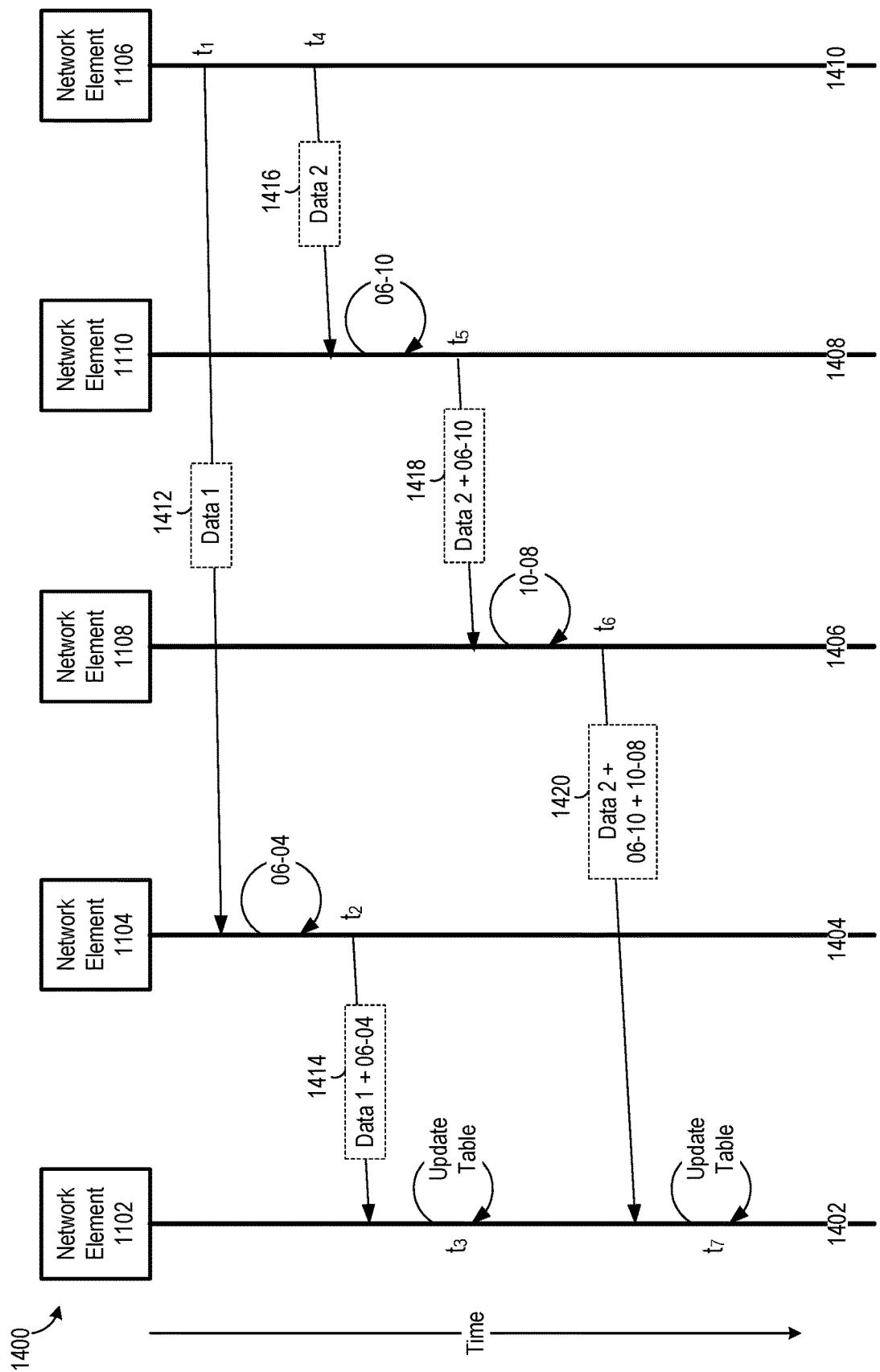
FIG. 14 is a is a dataflow diagram illustrating one example of operation of the FIG. 11 communication network.

FIG. 14 is a dataflow diagram 1400 illustrating one example of operation of communication network 1100. Vertical lines 1402, 1404, 1406, 1408, and 1410 logically represent network elements 1102, 1104, 1108, 1110, and 1106, respectively. At time $t_1$, network element 1106 sends a data structure 1412 including data 1 to network element 1104. Network element 1104 adds time for data structure 1412 to travel from network element 1106 to network element 1104 (06-04) as in-band telemetry data to data structure 1412, to generate data structure 1414. Network element 1104 then sends data structure 1414 to network element 1102 at $t_2$. Network element 1102 subsequently updates a telemetry table at time $t_3$ based on telemetry data included in data structure 1414, as well as time for data structure 1414 to travel from network element 1104 to network element 1102 (04-02). Table 5 shows one example of the telemetry table after it is updated at time $t_3$, if 06-04 is 21 ms and 04-02 is 13 ms. As shown in Table 5, the total latency for data 1 to travel from network element 1106 to network element 1102 via Path A is 34 ms.

TABLE 5

Telemetry Table

| | 06-04 | 04-02 | Total |
|---|---|---|---|
| Path A | 21 ms | 13 ms | 34 ms |

At time $t_4$, network element 1106 sends a data structure 1416 including data 2 to network element 1110. Network element 1110 adds time for data structure 1416 to travel from network element 1106 to network element 1110 (06-10) as in-band telemetry data to data structure 1416, to generate data structure 1418. Network element 1110 then sends data structure 1418 to network element 1108 at $t_5$. Network element 1108 adds time for data structure 1418 to travel from network element 1110 to network element 1108 (10-08) as in-band telemetry data to data structure 1418, to generate data structure 1420. Network element 1108 then sends data structure 1420 to network element 1102 at $t_6$. Network element 1102 subsequently updates the telemetry table at time $t_7$ based on telemetry data included in data structure 1420, as well as time for data structure 1420 to travel from network element 1108 to network element 1102 (08-02). Table 6 shows one example of the telemetry table after it is updated at time $t_7$, if 06-10 is 4 ms, 10-08 is 7 ms, and 08-02 is 6 ms. As shown in Table 6, the total latency for data 2 to travel from network element 1106 to network element 1102 via Path B is 17 ms.

TABLE 6

Telemetry Table

|  | 06-04 | 04-02 | 06-10 | 10-08 | 08-02 | Total |
|---|---|---|---|---|---|---|
| Path A | 21 ms | 13 ms | — | — | — | 34 ms |
| Path B | — | — | 4 ms | 7 ms | 6 ms | 17 ms |

Network element 1102 determines from the updated telemetry table that Path B has a lower latency than Path A, i.e. latency of Path B is 17 ms and latency of Path A is 34 ms. In response, network element 1102 causes the next data structure to be routed between network elements 1102 and 1106 to be routed via Path B. For example, network element 1102 may instruct network element 1106 to route its next data structure destined for network element 1102 via Path B. As another example, network element 1102 may send a data structure destined for network element 1106 via Path B instead of Path A. Network element 1102 updates the telemetry table as it receives additional data structures with new in-band telemetry data.

Figure 15:
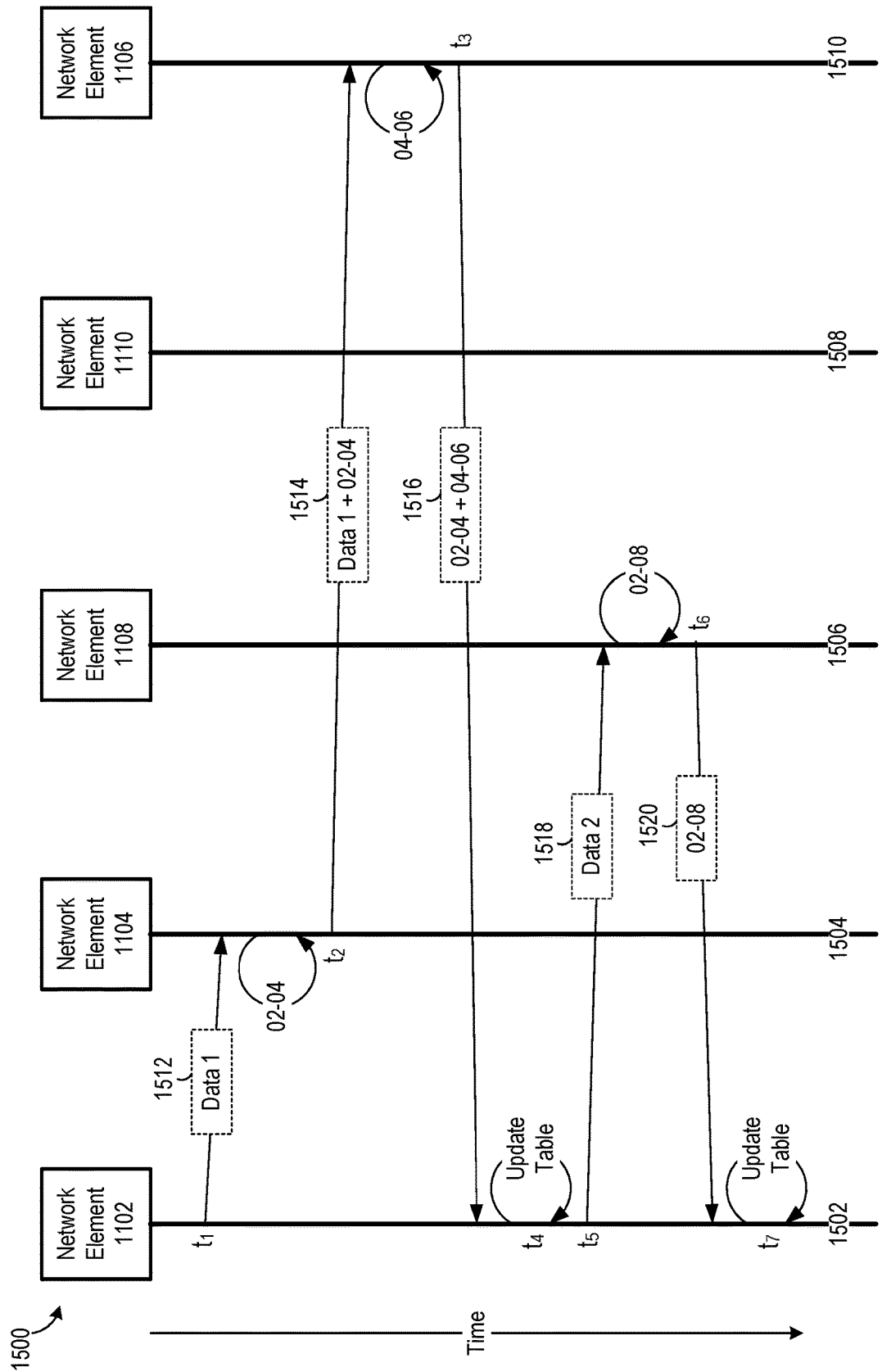
FIG. 15 is a dataflow diagram illustrating another example of operation of the FIG. 11 communication network.

FIG. 15 is a is a dataflow diagram 1500 illustrating another example of operation of communication network 1100. Vertical lines 1502, 1504, 1506, 1508, and 1510 logically represent network elements 1102, 1104, 1108, 1110, and 1106, respectively. At time $t_1$, network element 1102 sends a data structure 1512 including data 1 to network element 1104. Network element 1104 adds time for data structure 1512 to travel from network element 1102 to network element 1104 (02-04) as in-band telemetry data to data structure 1512, to generate data structure 1514. Network element 1104 then sends data structure 1514 to network element 1106 at $t_2$. Network element 1106 then generates a data structure 1516 including 02-04 and time for data structure 1512 to travel from network element 1104 to network element 1106 (04-06). Network element 1106 sends data structure 1516 to network element 1102 at time $t_3$. Data structure 1516 optionally includes additional data (not shown).

Network element 1102 subsequently updates a telemetry table at time $t_4$ based on telemetry data included in data structure 1516. Table 7 shows one example of the telemetry table after it is updated at time $t_4$, if 02-04 is 8 ms and 04-06 is 11 ms. As shown in Table 7, the total latency for data 1 to travel from network element 1102 to network element 1106 via Path A is 19 ms.

TABLE 7

Telemetry Table

|  | 02-04 | 04-06 | Total |
|---|---|---|---|
| Path A | 8 ms | 11 ms | 19 ms |

At time $t_5$, network element 1102 sends a data structure 1518 including data 2 to network element 1108. Network element 1108 then generates a data structure 1520 including time for data structure 1518 to travel from network element 1102 to network element 1108 (02-08). Network element 1108 sends data structure 1520 to network element 1102 at time $t_6$. Data structure 1520 optionally includes additional data (not shown). Network element 1102 subsequently updates the telemetry table at time $t_7$ based on telemetry data included in data structure 1520. Table 8 shows one example of the telemetry table after it is updated at time $t_7$, if 02-08 is 2 ms.

TABLE 8

Telemetry Table

|  | 02-04 | 04-06 | 02-08 | 08-10 | 10-06 | Total |
|---|---|---|---|---|---|---|
| Path A | 8 ms | 11 ms | — | — | — | 19 ms |
| Path B | — | — | 2 ms |  |  |  |

The telemetry table does not have complete data for Path B when updated at time $t_7$. However, network element 1102 continues to update the telemetry table as it continues to receive telemetry data using a procedure analogous to that discussed above, such that the telemetry table will over time include complete data for Path B. Network element 1102 subsequently causes data to be routed between network elements 1102 and 1106 via whichever Path has a lowest latency.

Figure 16:
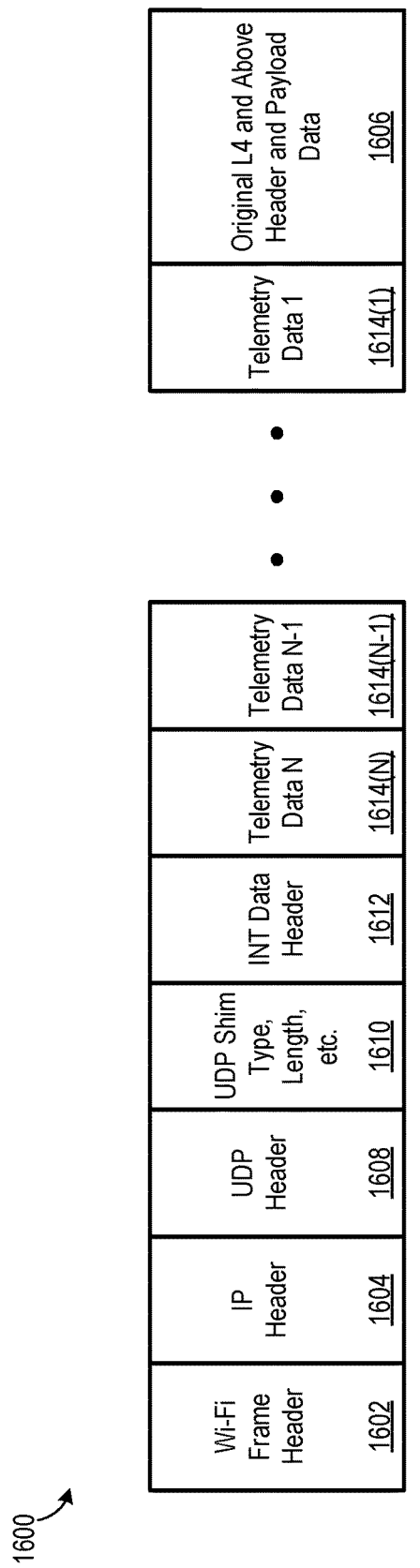
FIG. 16 is a schematic diagram of one example of a data frame of the FIG. 11 communication network.
Figure 17:
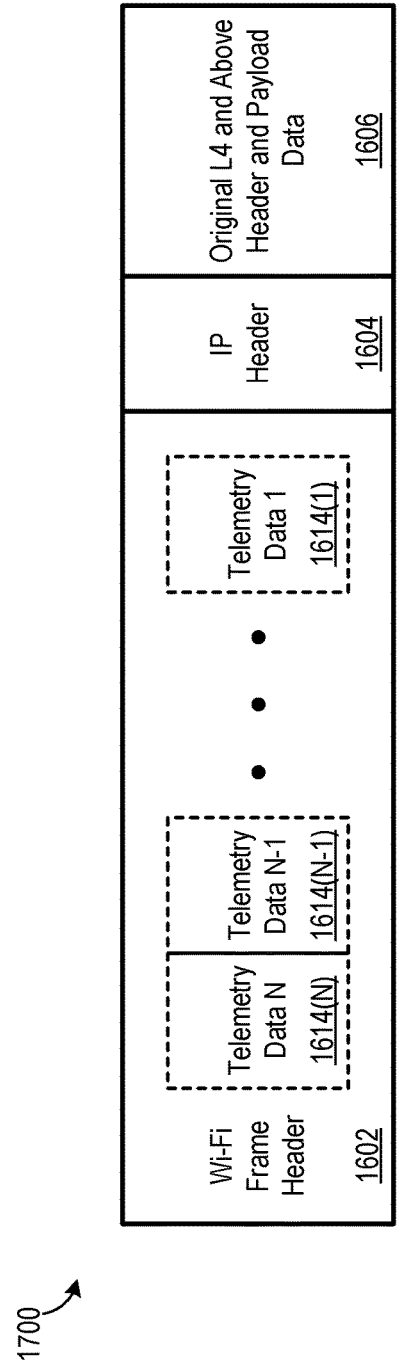
FIG. 17 is a schematic diagram of an alternate embodiment of FIG. 16 data frame.

FIGS. 16 and 17 illustrate a couple of possible embodiments of data structures of communication network 1100. However, it is understood that communication network 1100 is not limited to these example data structures.

FIG. 16 is a schematic diagram of a data frame 1600, which is one possible configuration of data frames in an embodiment of the FIG. 11 communication system supporting Wi-Fi wireless communication. Data frame 1600 includes a (a) Wi-Fi frame header 1602, (b) an IP header 1604, such as specified by a user equipment device, and (c) an element 1606 including original layer 4 (and above) header and payload data. Data frame 1600 additionally includes the following P4 elements to implement in-band telemetry data: (a) a user datagram protocol (UDP) header 1608, (b) an element 1610 specifying UDP shim type, length, etc., (c) in-band telemetry (INT) data header 1612, and (d) N telemetry data elements 1614, where N is an integer greater than or equal to one. Each telemetry data element 1614 specifies, for example, telemetry data inserted at a network element.

FIG. 17 is a schematic diagram of a data frame 1700, which is alternate embodiment of data frame 1600 with P4 elements omitted. Telemetry elements 1614 are embedded in Wi-Fi frame header 1602 in data frame 1700.

Figure 18:
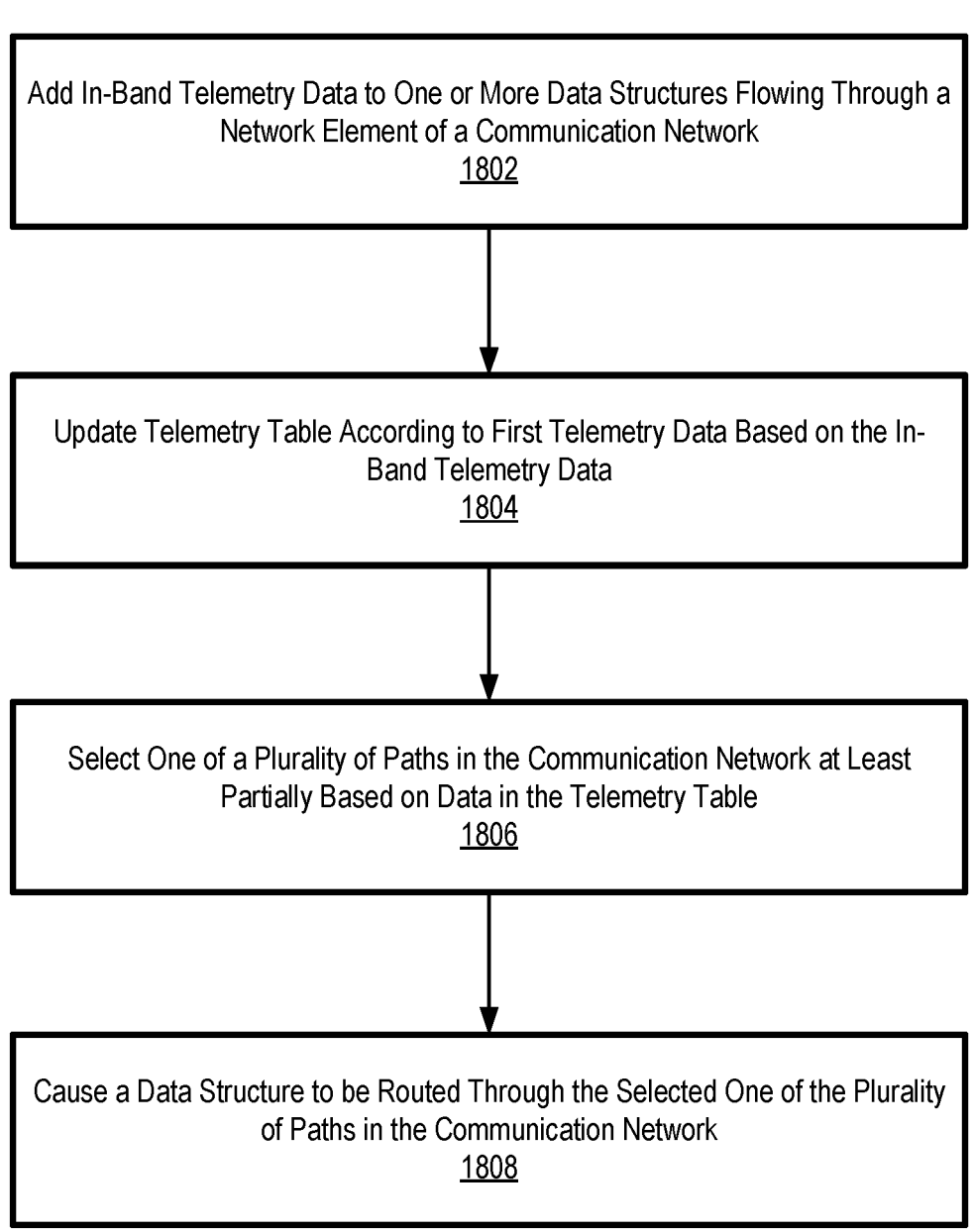
FIG. 18 is a flow chart illustrating another method for reducing communication network performance degradation using in-band telemetry data, according to an embodiment.

FIG. 18 is flow chart of a method 1800 for reducing communication network performance degradation using in-band telemetry data. In a block 1802 of method 1800, in-band telemetry data is added to one or more data structures flowing through a network element of a communication network. In one example of block 1802, network elements 1102, 1104, 1108, and 1110 add in-band telemetry data to data structures, such as discussed above with respect to FIG. 14. In a block 1804 of method 1800, the telemetry table is updated according to first telemetry data that is based on the in-band telemetry data. In one example of block 1804, network element 1102 updates the telemetry table as discussed above with respect to FIG. 14. In a block 1806 of method 1800, one of a plurality of paths in the communication network is selected at least partially based on data in the telemetry table. In one example of block 1806, network element 1102 selects Path B based on the telemetry table data in the FIG. 14 example. In a block 1810, a data structure is caused to be routed through the selected one of the plurality of paths in the communication network. In one example of block 1810, network element 1102 instructs network element 1106 to route its next data structure destined for network element 1102 via Path B.

Features described above may be combined in various ways without departing from the scope hereof. The following examples illustrate some possible combinations:

(A1) A method for reducing communication network performance degradation using in-band telemetry data includes (1) receiving, at an analytics engine of a communication network, first telemetry data from a first network element of the communication network, the first telemetry data being based on in-band telemetry data at the first network element, (2) determining from the first telemetry data that there is performance degradation in at least a portion of the communication network, and (3) in response to determining that there is performance degradation in at least the portion of the communication network, sending a message from the analytics engine to a second network element of the communication network.

(A2) The method denoted as (A1) may further include reducing a rate of data transmission in the communication network in response to receiving the message at the second network element of the communication network.

(A3) Any one of the methods denoted as (A1) and (A2) may further include changing a configuration of the communication network in response to receiving the message at the second network element of the communication network.

(A4) Any one of the methods denoted as (A1) through (A3) may further include changing operation of a server in the communication network in response to receiving the message at the second network element of the communication network.

(A5) In any one of the methods denoted as (A1) through (A4), the first network element may be a first termination device communicatively coupled to a shared communication link.

(A6) The method denoted as (A5) may further include reducing a rate of data transmission through the shared communication link in response to receiving the message at the second network element of the communication network.

(A7) In any one of the methods denoted as (A5) through (A6), the second network element of the communication network may be a client communicatively coupled to the first termination device.

(A8) The method denoted as (A5) may further include reducing a rate of data transmission through the shared communication link to a radio unit (RU), in response to receiving the message at the second network element of the communication network.

(A9) In the method denoted as (A8), the second network element of the communication network may include a wireless communication network element.

(A10) In any one of the methods denoted as (A1) through (A4), (1) the second network element of the communication network may include a gaming server, and (2) the method may further include reducing a rate of data transfer between the gaming server and a work station, in response to receipt of the message at the gaming server.

(A11) In the method denoted as (A10), (1) the first network element may be a first termination device communicatively coupled to a shared communication link, and (2) data travels between the gaming server and the workstation via the shared communication link.

(A12) In any one of the methods denoted as (A1) through (A4), the second network element of the communication network may include a network controller.

(A13) The method denoted as (A12) may further include changing operation of the first network element in response to receipt of the message at the network controller.

(A14) In the method denoted as (A13), the first network element may include a software defined network element.

(A15) In any one of the methods denoted as (A1) through (A14), the in-band telemetry data at the first network element may include at least one of a queue status and a time stamp.

(A16) In any one of the methods denoted as (A1) through (A15), the performance degradation in at least the portion of the communication network may include one or more of congestion, insufficient throughput, excessive queue depth, and excessive errors.

(B1) A method for reducing communication network performance degradation using in-band telemetry data may include (1) adding in-band telemetry data to one or more data structures flowing through a network element of a communication network, (2) updating a telemetry table according to first telemetry data that is based on the in-band telemetry data, (3) selecting one of a plurality of paths in the communication network at least partially based on data in the telemetry table, and (4) causing a data structure to be routed through the selected one of the plurality of paths in the communication network.

(B2) In the method denoted as (B1), the in-band telemetry data may include time for a data structure to travel between two network elements of the communication network.

(B3) In any one of the methods denoted as (B1) and (B2), the telemetry table may specify a respective total latency for each path of the plurality of paths of the communication network.

(B4) In the method denoted as (B3), selecting one of the plurality of paths in the communication network at least partially based on data in the telemetry table may include selecting a path having a lowest total latency.

(B5) In any one of the methods denoted as (B1)-(B4), the in-band telemetry data may include at least one of the following: (a) a queue depth, (b) a signal strength, (c) a time stamp, (d) an identification of a network element, (e) a connection type, (f) a number of retransmits on a communication link, (g) a signal to noise ratio (SNR), (h) a communication link cost of use, and (i) error correction information.

(C1) A method for improving communication network performance using in-band telemetry data includes (1) receiving, at an analytics engine of a communication network, first telemetry data from a first network element of the communication network, the first telemetry data being based on in-band telemetry data at the first network element, (2) determining, from the first telemetry data, one or more characteristics of the communication network, and (3) in response to determining the one or more characteristics of the communication network, sending a message from the analytics engine to a second network element of the communication network.

(C2) The method denoted as (C1) may further include changing a rate of data transmission in the communication network in response to receiving the message at the second network element of the communication network.

(C3) Any one of the methods denoted as (C1) and (C2) may further include changing a configuration of the communication network in response to receiving the message at the second network element of the communication network.

(C4) Any one of the methods denoted as (C1) through (C3) may further include changing resources allocated to a network element of the communication network in response to receiving the message at the second network element of the communication network.

(C5) In any one of the methods denoted as (C1) through (C4), the first network element may be a first termination device communicatively coupled to a shared communication link, and the method may further include changing a rate of data transmission through the shared communication link in response to receiving the message at the second network element of the communication network.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for reducing communication network performance degradation using in-band telemetry data in a communication network including a central wireless access point and one or more remote wireless access points, the method comprising:
    at each of the one or more remote wireless access points, wirelessly receiving one or more Institute of Electrical and Electronics Engineers (IEEE) 802.11-based data structures including first content data, adding in-band telemetry data to the one or more IEEE 802.11-based data structures after wirelessly receiving the one or more IEEE 802.11-based data structures such that the one or more IEEE 802.11-based data structures include the first content data and the in-band telemetry data, and wirelessly repeating the one or more IEEE 802.11-based data structures after adding the in-band telemetry data to the one or more IEEE 802.11-based data structures, to support wireless transmission of the one or more IEEE 802.11-based data structures via one or more paths between the central wireless access point and a user equipment (UE) device;
    updating a telemetry table according to first telemetry data that is based on the in-band telemetry data;
    selecting one of a plurality of paths in the communication network at least partially based on data in the telemetry table; and
    causing a data structure to be routed through the selected one of the plurality of paths in the communication network.

2. The method of claim 1, wherein the in-band telemetry data includes time for a data structure to travel between two network elements of the communication network.

3. The method of claim 1, wherein the telemetry table specifies a respective total latency for each path of the plurality of paths of the communication network.

4. The method of claim 3, wherein selecting one of the plurality of paths in the communication network at least partially based on data in the telemetry table comprises selecting a path having a lowest total latency.

5. The method of claim 1, wherein the in-band telemetry data includes at least one of the following: (a) a queue depth, (b) a signal strength, (c) a time stamp, (d) an identification of a network element, (e) a connection type, (f) a number of retransmits on a communication link, (g) a signal to noise ratio (SNR), (h) a communication link cost of use, and (i) error correction information.

6. The method of claim 1, wherein the communication network is a mesh wireless communication network.

7. The method of claim 1, wherein updating the telemetry table according to the first telemetry data that is based on the in-band telemetry data is performed by the central wireless access point.

8. The method of claim 1, wherein the in-band telemetry data is included in Programming Protocol-independent Pack Processors (P4) elements of data frames.

9. The method of claim 1, wherein the in-band telemetry data is included in Wi-Fi frame headers of data frames.

10. A method for reducing communication network performance degradation using in-band telemetry data in a communication network including a central wireless access point and one or more remote wireless access points, the method comprising:
    at each of the one or more remote wireless access points, wirelessly receiving one or more Institute of Electrical and Electronics Engineers (IEEE) 802.11-based data structures including first content data, adding in-band telemetry data to the one or more IEEE 802.11-based data structures after wirelessly receiving the one or more IEEE 802.11-based data structures such that the one or more IEEE 802.11-based data structures include the first content data and the in-band telemetry data, and wirelessly repeating the one or more IEEE 802.11-based data structures after adding the in-band telemetry data to the one or more IEEE 802.11-based data structures, to support wireless transmission of the one or more IEEE 802.11-based data structures via one or more paths between the central wireless access point and a user equipment (UE) device;
    updating a telemetry table according to first telemetry data that is based on the in-band telemetry data; and
    determining from the telemetry table which path of a plurality of paths in the communication network has a lowest latency of the plurality of paths in the communication network.

11. The method of claim 10, wherein the communication network is a mesh wireless communication network.

12. The method of claim 10, wherein the in-band telemetry data is included in Programming Protocol-independent Pack Processors (P4) elements of data frames.

13. The method of claim 10, wherein the in-band telemetry data is included in Wi-Fi frame headers of data frames.

14. The method of claim 1, wherein the communication network is a mesh wireless communication network in a building.

15. The method of claim 10, wherein the communication network is a mesh wireless communication network in a building.

* * * * *